US011634003B2

(12) United States Patent
Negishi et al.

(10) Patent No.: US 11,634,003 B2
(45) Date of Patent: Apr. 25, 2023

(54) AUTOMATED CONTROL SYSTEM FOR AN ELECTRONICALLY CONTROLLED SWAY BAR LINK

(71) Applicant: Fox Factory, Inc., Duluth, GA (US)

(72) Inventors: Nobuhiko Negishi, Santa Cruz, CA (US); Rick Strickland, Scotts Valley, CA (US); Philip Tsiaras, Dacula, GA (US); Andrew Peterson, Braselton, GA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/553,134

(22) Filed: Dec. 16, 2021

(65) Prior Publication Data

US 2022/0194161 A1 Jun. 23, 2022

Related U.S. Application Data

(60) Provisional application No. 63/126,787, filed on Dec. 17, 2020.

(51) Int. Cl.
*B60G 21/055* (2006.01)
*B60G 17/015* (2006.01)

(52) U.S. Cl.
CPC ..... *B60G 21/0556* (2013.01); *B60G 17/0157* (2013.01); *B60G 2202/135* (2013.01);
(Continued)

(58) Field of Classification Search
CPC .............. B60G 17/015; B60G 17/0157; B60G 17/0162; B60G 17/0165; B60G 17/08; B60G 21/0553; B60G 21/0556; B60G 21/0558; B60G 2202/135; B60G 2202/413; B60G 2202/44; B60G 2202/442; B60G 2204/1224; B60G 2206/11; B60G 2400/204; B60G 2400/41; B60G 2401/142; B60G 2401/28; B60G 2600/20; B60G 2600/202; B60G 2800/012

See application file for complete search history.

(56) References Cited

U.S. PATENT DOCUMENTS 3,986,118 A 10/1976 Madigan
4,773,671 A 9/1988 Inagaki
(Continued)

FOREIGN PATENT DOCUMENTS

DE 202013100681 U1 4/2013
EP 0829383 A2 3/1998
(Continued)

OTHER PUBLICATIONS

"Extended European Search Report for EP Application 18197941.0 dated Feb. 27, 2019, 11 pages".
(Continued)

*Primary Examiner* — Laura Freedman
*Assistant Examiner* — Daniel M. Keck

(57) ABSTRACT

A sway bar system is described. The sway bar system includes a sway bar having a first end and a second end. An electronically controlled connector to provide a remotely controllable physical connection and disconnection capability between a first location on a vehicle and the first end of the sway bar; and the second end of the sway bar coupled to a second location on the vehicle.

16 Claims, 12 Drawing Sheets

(52) U.S. Cl.
CPC .... *B60G 2202/44* (2013.01); *B60G 2202/442* (2013.01); *B60G 2204/1224* (2013.01); *B60G 2600/202* (2013.01)

(56) References Cited

U.S. PATENT DOCUMENTS

| | | | |
|---|---|---|---|
| 4,984,819 | A | 1/1991 | Kakizaki et al. |
| 5,027,303 | A | 6/1991 | Witte |
| 5,105,918 | A | 4/1992 | Hagiwara et al. |
| 5,186,486 | A | 2/1993 | Hynds et al. |
| 5,362,094 | A | 11/1994 | Jensen |
| 5,390,949 | A | 2/1995 | Naganathan et al. |
| 5,952,823 | A | 9/1999 | Sprecher et al. |
| 5,987,366 | A | 11/1999 | Jun |
| 6,073,536 | A | 6/2000 | Campbell |
| 6,244,398 | B1 | 6/2001 | Girvin et al. |
| 6,427,812 | B2 | 8/2002 | Crawley et al. |
| 6,863,291 | B2 | 3/2005 | Miyoshi |
| 6,935,157 | B2 | 8/2005 | Miller |
| 7,374,028 | B2 | 5/2008 | Fox |
| 8,550,223 | B2 | 10/2013 | Cox et al. |
| 8,627,932 | B2 | 1/2014 | Marking |
| 8,807,542 | B2 | 8/2014 | Wootten et al. |
| 8,838,335 | B2 | 9/2014 | Bass et al. |
| 8,857,580 | B2 | 10/2014 | Marking |
| 9,033,122 | B2 | 5/2015 | Ericksen et al. |
| 9,120,362 | B2 | 9/2015 | Marking |
| 9,239,090 | B2 | 1/2016 | Marking et al. |
| 9,353,818 | B2 | 5/2016 | Marking |
| 9,452,654 | B2 | 9/2016 | Ericksen et al. |
| 9,623,716 | B2 | 4/2017 | Cox |
| 9,682,604 | B2 | 6/2017 | Cox et al. |
| 9,797,467 | B2 | 10/2017 | Wootten et al. |
| 10,036,443 | B2 | 7/2018 | Galasso et al. |
| 10,040,329 | B2 | 8/2018 | Ericksen et al. |
| 10,047,817 | B2 | 8/2018 | Ericksen et al. |
| 10,060,499 | B2 | 8/2018 | Ericksen et al. |
| 10,415,662 | B2 | 9/2019 | Marking |
| 10,933,710 | B2 | 3/2021 | Tong |
| 10,981,429 | B2 | 4/2021 | Tsiaras et al. |
| 2004/0173985 | A1 | 9/2004 | Bruhl et al. |
| 2004/0231904 | A1 | 11/2004 | Beck et al. |
| 2005/0077696 | A1 | 4/2005 | Ogawa |
| 2008/0203694 | A1 | 8/2008 | Gartner et al. |
| 2009/0267311 | A1 | 10/2009 | Ohnuma et al. |
| 2013/0228404 | A1 | 9/2013 | Marking |
| 2014/0008160 | A1 | 1/2014 | Marking et al. |
| 2014/0224606 | A1 | 8/2014 | Baales et al. |
| 2014/0239602 | A1 | 8/2014 | Blankenship et al. |
| 2015/0224845 | A1 | 8/2015 | Wadhany et al. |
| 2017/0120713 | A1 | 5/2017 | Drozdowski et al. |
| 2017/0129302 | A1 | 5/2017 | Jackson |
| 2017/0136842 | A1 | 5/2017 | Anderson et al. |
| 2021/0061052 | A1* | 3/2021 | Kim ................... B60G 21/0556 |

FOREIGN PATENT DOCUMENTS

| | | | | |
|---|---|---|---|---|
| EP | 1022169 | A2 * | 7/2000 | ......... B60G 21/0553 |
| EP | 1238833 | A1 * | 9/2002 | ......... B60G 17/0162 |
| EP | 3461663 | A1 * | 4/2019 | ............. B60G 11/27 |
| EP | 4112339 | A1 | 1/2023 | |
| FR | 2927020 | A1 | 8/2009 | |
| FR | 3040331 | A1 | 3/2017 | |
| GB | 2343663 | A | 5/2000 | |
| GB | 2377415 | A * | 1/2003 | ......... B60G 21/0556 |
| JP | H04191115 | A | 7/1992 | |
| JP | H11165521 | A | 6/1999 | |
| JP | 2001105827 | A | 4/2001 | |

OTHER PUBLICATIONS

European Search Report for EP Application No. 21215569.1, 9 pages, dated May 10, 2022.

Extended European Search Report for EP Application 22177563.8, dated Nov. 11, 2022, 14 pages.

* cited by examiner

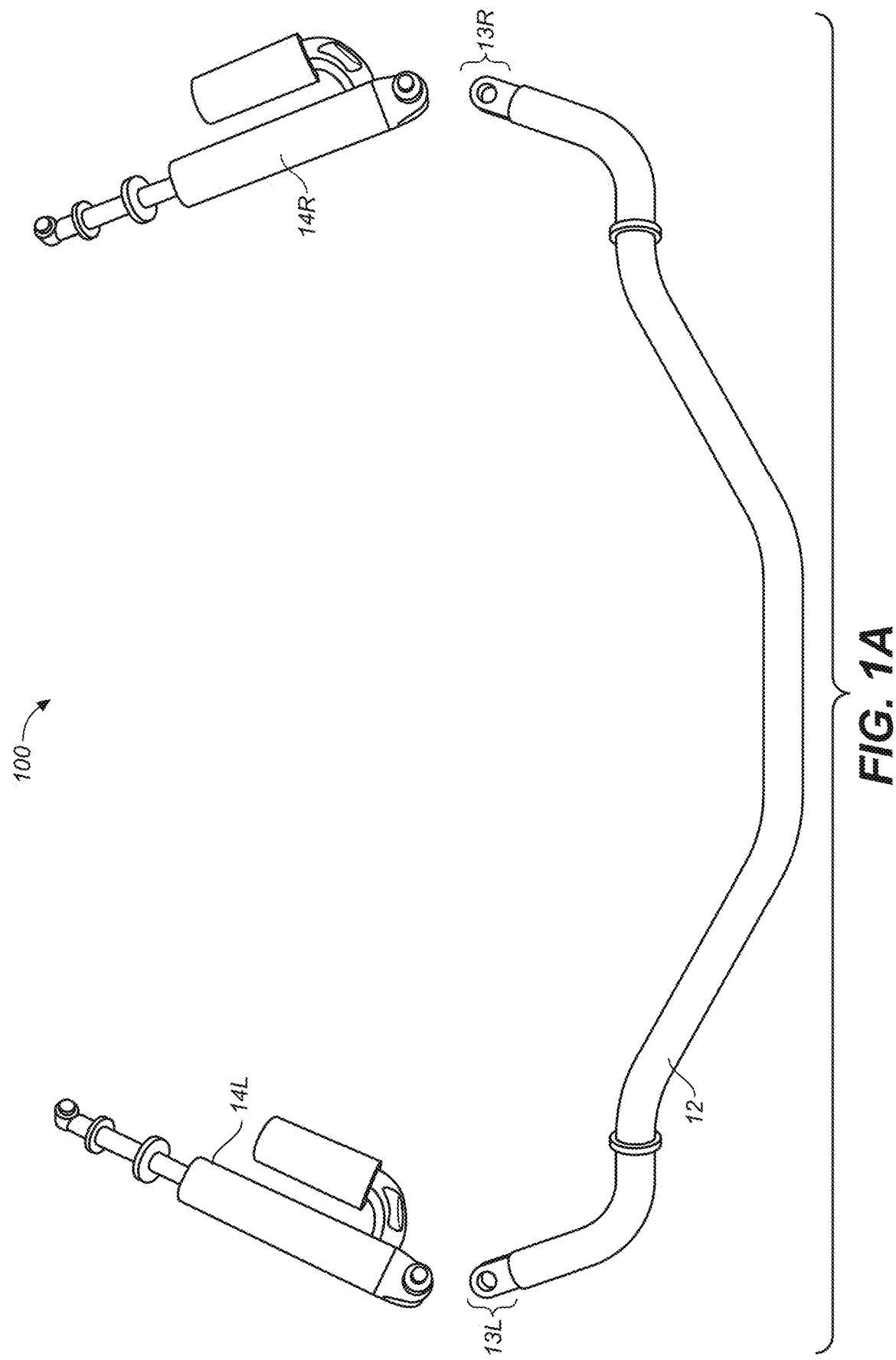

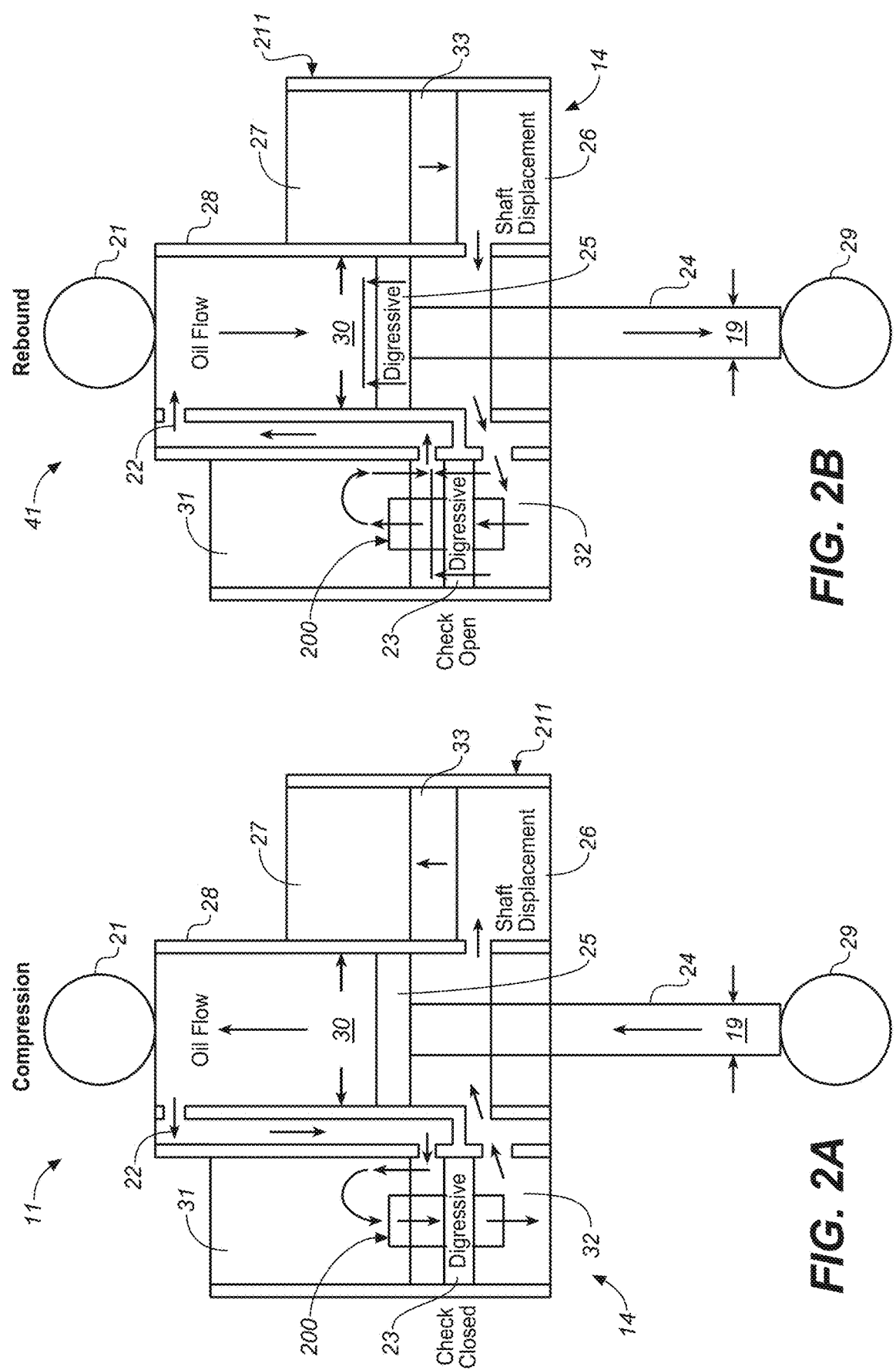

*FIG. 8*
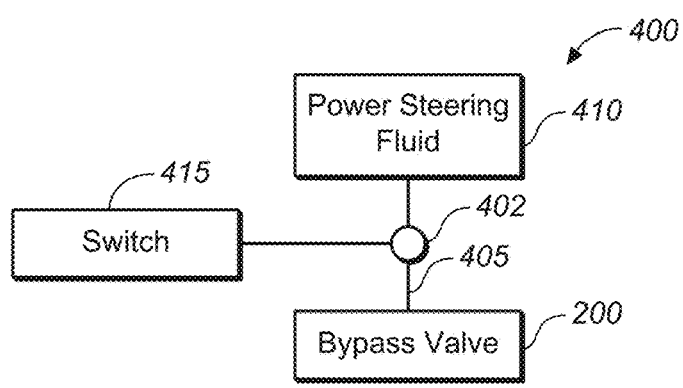
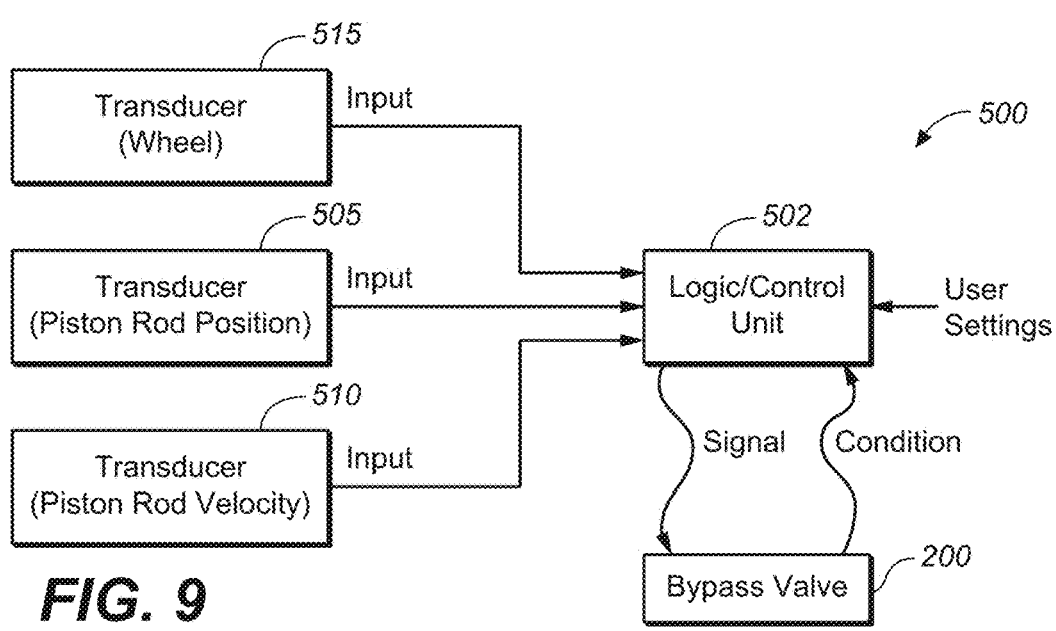
*FIG. 9*
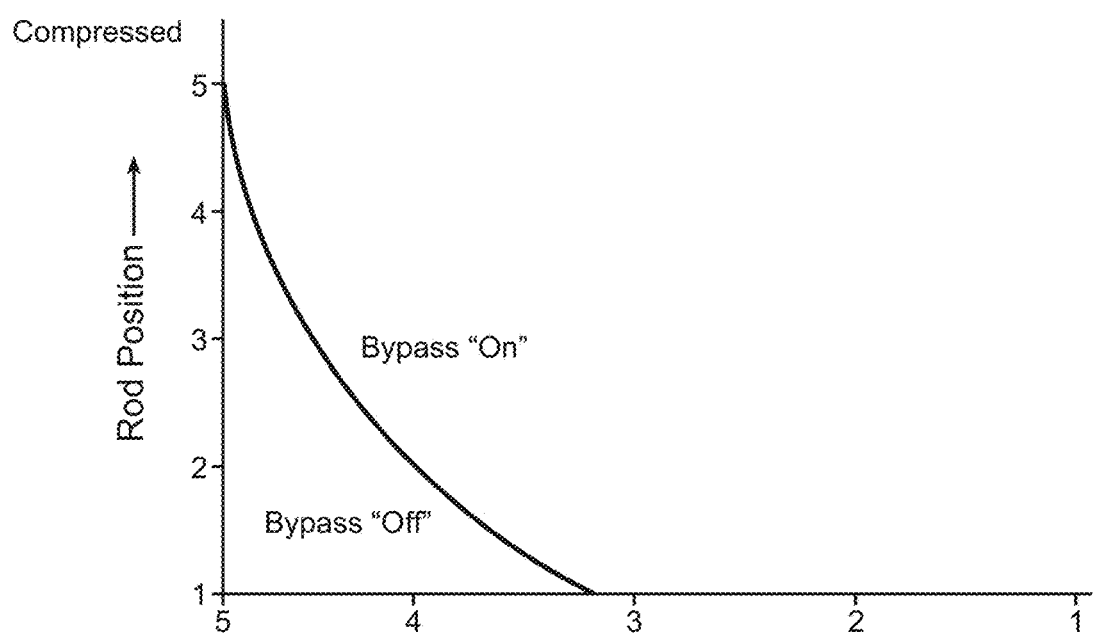
*FIG. 10*

AUTOMATED CONTROL SYSTEM FOR AN ELECTRONICALLY CONTROLLED SWAY BAR LINK

CROSS-REFERENCE TO RELATED APPLICATIONS (PROVISIONAL)

This application claims priority to and benefit of U.S. Provisional Patent Application No. 63/126,787 filed on Dec. 17, 2020, entitled "AN AUTOMATED CONTROL SYSTEM FOR AN ELECTRONICALLY CONTROLLED SWAY BAR LINK" by Nobuhiko Negishi, and assigned to the assignee of the present application, the disclosure of which is hereby incorporated by reference in its entirety.

INCORPORATION BY REFERENCE

This application incorporates by reference U.S. patent application Ser. No. 17/232,612, filed on Apr. 16, 2021, entitled "ELECTRONICALLY CONTROLLED SWAY BAR DAMPING LINK" by Philip Tsiaras et al., assigned to the assignee of the present application, and is hereby incorporated by reference herein in their entireties.

This application incorporates by reference U.S. patent application Ser. No. 16/144,875 filed on Sep. 27, 2018, now U.S. Issued U.S. Pat. No. 10,981,429, entitled "ELECTRONICALLY CONTROLLED SWAY BAR DAMPING LINK" by Philip Tsiaras et al, the disclosure of which is hereby incorporated herein by reference in its entirety.

This application incorporates by reference U.S. Provisional Patent Application 62/566,022 filed on Sep. 29, 2017, entitled "ELECTRONICALLY CONTROLLED SWAY BAR DAMPING LINK" by Philip Tsiaras et al, the disclosure of which is hereby incorporated herein by reference in its entirety.

FIELD OF THE INVENTION

Embodiments of the technology relate generally to sway bar on a vehicle.

BACKGROUND

A sway bar (anti-sway bar, roll bar, anti-roll bar, stabilizer bar) is a part of an automobile suspension that reduces the body roll of a vehicle. The sway bar is basically a torsion spring that resists body roll motions. Often, it is formed from a cylindrical steel bar patterned in a "U" shape. A conventional sway bar assembly includes a sway bar and also includes two end links. Typically, the first of the two end links is flexibly coupled to one end of the sway bar, and the second of the two end links is flexibly coupled to the other end of the sway bar. Each of the two end links are then connected to a location on the vehicle near a wheel or axle (such as coupled to a control arm or other suspension feature) at respective left and right sides of the suspension for the vehicle. As a result, when the left and right sides of the suspension move together, the sway bar rotates about its mounting points. However, when the left and right sides of the suspension move relative to one another, the sway bar is subjected to torsion and forced to twist. The twisting of the sway bar transfers the forces between a heavily-loaded suspension side (the side of the vehicle subjected to more roll movement force than the other side of the vehicle) to the opposite, lesser-loaded, suspension side (the side of the vehicle subjected to lesser roll movement force than the other side of the vehicle).

BRIEF DESCRIPTION OF THE DRAWINGS

Aspects of the different embodiments are illustrated by way of example, and not by way of limitation, in the accompanying drawings, wherein:

FIG. 1A is a perspective view of a sway bar system including at least one electronically controlled damper link, in accordance with an embodiment.

FIG. 2A is a cutaway schematic view of an electronically controlled damper link in a state of compression, in accordance with an embodiment.

FIG. 2B is a cutaway schematic view of an electronically controlled damper link in a state of rebound, in accordance with an embodiment.

FIG. 8 is a schematic diagram showing a control arrangement for a remotely operated valve, in accordance with one embodiment.

FIG. 9 is a schematic diagram showing another control arrangement for a remotely operated valve, in accordance with one embodiment.

FIG. 10 is a graph showing some operational characteristics of the arrangement of FIG. 7, in accordance with one embodiment.

Figure 1B:
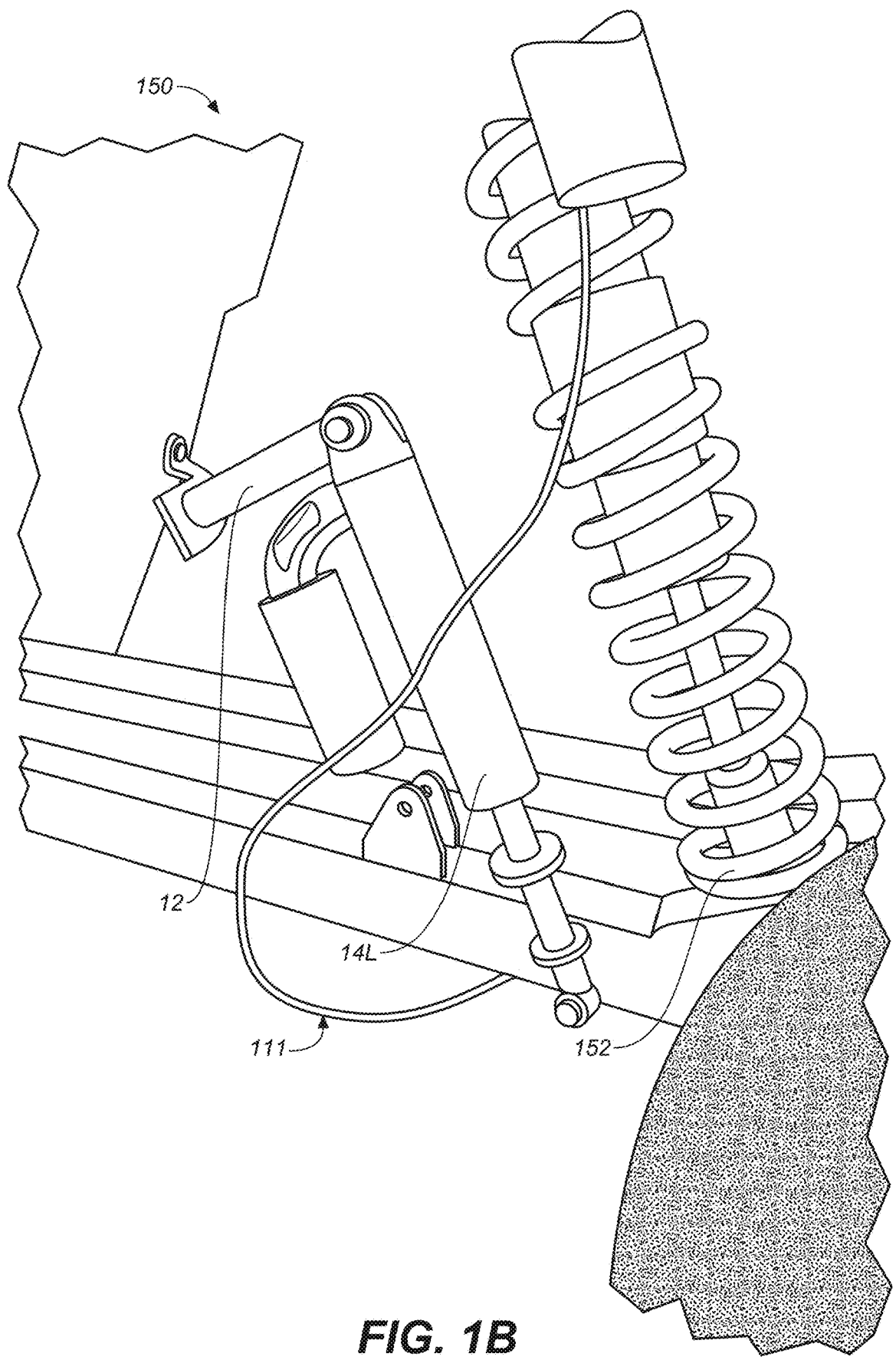
FIG. 1B is a perspective view of a sway bar system including at least one electronically controlled damper link installed in a vehicle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments and is not intended to re the only embodiments in which the technology is to be practiced. Each embodiment described in this disclosure is provided merely as an example or illustration of one or more embodiments, and should not necessarily be construed as preferred or advantageous over other embodiments. In some instances, well known methods, procedures, objects, and circuits have not been described in detail as not to unnecessarily obscure aspects of the disclosure.

In the following discussion, embodiments of the sway bar system (also referred to herein as an "E-Sway Bar" system) are described in detail. As will be described below, embodiments of the sway bar system advantageously enable remote input (e.g., manual remote input or automatic remote input) to manipulate the stiffness of the sway bar system. The stiffness of the sway bar system can be thought of as, for example, a driver's (or passenger's) perception of the "roll stability" of the vehicle. In other words, the perception of the driver (or passenger) of the vehicle for the vehicle to resist or allow "roll motion". As one example, when riding in a vehicle (e.g., a sports car) which appears to provide significant resistance to a rolling motion of the vehicle, it can be said that the vehicle has a "stiff" sway bar system. As another example, when riding in a vehicle (e.g., a motorhome or bus) which appears to not provide significant resistance to a rolling motion of the vehicle, it can be said that the vehicle has a "soft" sway bar system.

It will be understood that a "soft" sway bar system is desired in various conditions. For example, a soft sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection of the sway bar from the suspension will provide additional performance enhancements and capabilities during slow maneuvering such as rock crawling, 4-wheeling, and other slower driving/obstacle clearing activities where maximum suspension articulation is desired, needed, and/or warranted. Further, it will be understood that "stiff" sway bar system is desired in various conditions such as normal speed driving, faster speed driving, or driving in a location or conditions that are not rock crawling and other slower driving/obstacle clearing activities, e.g., in locations where maximum articulation is not more important than ensuring the vehicle does not tip over due to body roll, or the like.

In contrast, in one embodiment a "soft" or range of softer settings of a connected sway bar system provides increased handling and body roll control during normal speed cornering and various driving activities. For example, it will be understood that a stiff sway bar system provides increased handling and control during high-speed cornering and various racing activities.

In one embodiment, a "hard" or range of settings from medium to all the way locked out settings of a connected sway bar system will provide increased handling and body roll control during high-speed cornering and various racing activities.

Further, in the following discussion, the term "active", as used when referring to a valve or damping component, means adjustable, manipulatable, etc., during typical operation of the valve. For example, a remotely controllable active valve 200 can have its operation changed to thereby alter a corresponding damping characteristic from a "soft" damping setting to a "firm" damping setting by, for example, adjusting a switch in a passenger compartment of a vehicle. Additionally, it will be understood that in some embodiments, a remotely controllable active valve 200 may also be configured to automatically adjust its operation, and corresponding damping characteristics, based upon, for example, operational information pertaining to the vehicle and/or the suspension with which the valve is used. Similarly, it will be understood that in some embodiments, a remotely controllable active valve 200 may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g., raise or lower) a wheel with respect to the vehicle. In a "semi-active suspension", no motive force/actuator is employed to adjust move (e.g., raise or lower) a wheel with respect to the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g., raise or lower) a wheel with respect to the vehicle. As such, it will be understood that an "remotely controllable active valve 200", as defined above, is well suited for use in a "pure active suspension" or a "semi-active suspension".

In one embodiment, the damping characteristic of at least one damper is obtained by controlling a remotely adjustable remotely controllable active valve 200 (may also be referred to as a remotely adjustable electronic valve or, more concisely, as just an remotely controllable active valve 200) of the damper, wherein the remotely adjustable remotely controllable active valve 200 utilizes a relatively small solenoid (using relatively low amounts of power) to generate relatively large damping forces. Examples of such a remotely controllable active and semi-active valves and their features are described and shown in U.S. Pat. Nos. 8,627,932; 8,857,580; 9,033,122; 9,120,362; and 9,239,090 the content of which are incorporated by reference herein, in their entirety.

Referring now to FIG. 1A, a perspective view of a sway bar system 100 including a sway bar 12 and two electronically controlled damper links, 14L and 14R, is shown in accordance with one embodiment. For purposes of clarity, in FIG. 1A, electronically controlled damper link 14L and electronically controlled damper link 14R are shown slightly separated from sway bar 12 in order to more clearly depict the location of connection 13L, where electronically controlled damper link 14L couples to sway bar 12, and to more clearly depict the location, 13R, where electronically controlled damper link 14R couples to sway bar 12. In various embodiments of sway bar system 100, an upper portion of electronically controlled damper link 14L includes a bushing, or similar coupling feature, to readily enable coupling of electronically controlled damper link 14L to, for example, at connection 13L of sway bar 12. Similarly, in various embodiments of sway bar system 100, an upper portion of electronically controlled damper link 14R includes a bushing, or similar coupling feature, to readily enable coupling of electronically controlled damper link 14R to, for example, 13R of sway bar 12. It should be noted that sway bar system 100 is not limited solely to the use of a bushing for coupling one or both of electronically controlled damper link 14L and electronically controlled damper link 14R to sway bar 12.

With reference still to FIG. 1A, in various embodiments of sway bar system 100, a lower portion of electronically controlled damper link 14L includes an eyelet, or similar coupling feature, to readily enable coupling of electronically controlled damper link 14L to a location on a vehicle. Similarly, in various embodiments of sway bar system 100, a lower portion of electronically controlled damper link 14R includes an eyelet, or similar coupling feature, to readily enable coupling of electronically controlled damper link 14R to a location on a vehicle. It should be noted that sway bar system 100 is not limited solely to the use of an eyelet for coupling one or both of electronically controlled damper link 14L and electronically controlled damper link 14R to a vehicle.

Although the embodiment of FIG. 1A, depicts sway bar system 100 having two electronically controlled damper links 14L and 14R, in another embodiment, sway bar system 100 includes only a single electronically controlled damper link (e.g., only 14L or only 14R). In such an embodiment, an electronically controlled damper link (e.g., 14L or 14R) is coupled to one end (e.g., a first end) of sway bar 12, and, for example, a conventional end link is coupled to the other end (e.g., a second end) of sway bar 12. Hence, sway bar system 100 is well suited to embodiments in which one end of sway bar 12 has an electronically controlled damper link (e.g., 14L or 14R) coupled thereto, and also to embodiments in which both ends of sway bar 12 have an electronically controlled damper link (e.g., 14L and 14R, respectively) coupled thereto. Additionally, for purposes of conciseness and clarity, portions of the following description may refer to an electronically controlled damper link as "electronically controlled damper link 14", instead repeating the same description for each of electronically controlled damper link 14L and electronically controlled damper link 14R. It should be noted that such portions of the description are applicable to either electronically controlled damper link 14L or electronically controlled damper link 14R, as shown in sway bar system 100 of FIG. 1A. Further, the description will pertain to embodiments in which one end of sway bar 12 has an electronically controlled damper electronically controlled damper link (e.g., 14L or 14R) coupled thereto, and also to embodiments in which both ends of sway bar 12 have an electronically controlled damper link (e.g., 14L and 14R, respectively) coupled thereto.

With reference now to FIG. 1B, a perspective view 150 is provided of sway bar system 100, of FIG. 1A, installed in a vehicle, in accordance with one embodiment. In the embodiment of FIG. 1B, sway bar 12 and at least one electronically controlled damper link 14L is shown installed in a vehicle 152. In one embodiment, sway bar system 100 is coupled to a vehicle with at least one end of sway bar 12 coupled to the vehicle by an electronically controlled damper link (e.g., 14L or 14R). That is, unlike conventional sway bar assemblies, in one embodiment, sway bar system 100 has one end of sway bar 12 coupled to a vehicle by an electronically controlled damper link (e.g., 14L or 14R).

In one embodiment, sway bar system 100 has both ends of sway bar 12 coupled to a vehicle by an electronically controlled damper link (e.g., 14L and 14R, respectively). As a result, and as will be described further below, the "stiffness" provided by sway bar system 100 can be remotely controlled by controlling the stiffness or compliance of one or both of electronically controlled damper links 14L and 14R coupling sway bar 12 to a vehicle. Importantly, FIG. 1B further shows a cable 111. Cable 111 is used to provide input to electronically controlled damper link 14. Such input is used to control the damping characteristics of electronically controlled damper link 14. In various embodiments, as are described below in detail, such input may consist of electrical input (based upon, e.g., user input, sensors-derived data, or any of various other sources) used to control an electronic valve within electronically controlled damper link 14 and, correspondingly, control the damping characteristics of electronically controlled damper link 14. Embodiments of the sway bar system 100 are also well suited to using a wireless signal (in addition to, or in lieu of, cable 111) to control a valve or other component of electronically controlled damper link 14 such that, ultimately, the damping characteristic of electronically controlled damper link 14 is controllable.

Figure 1C:
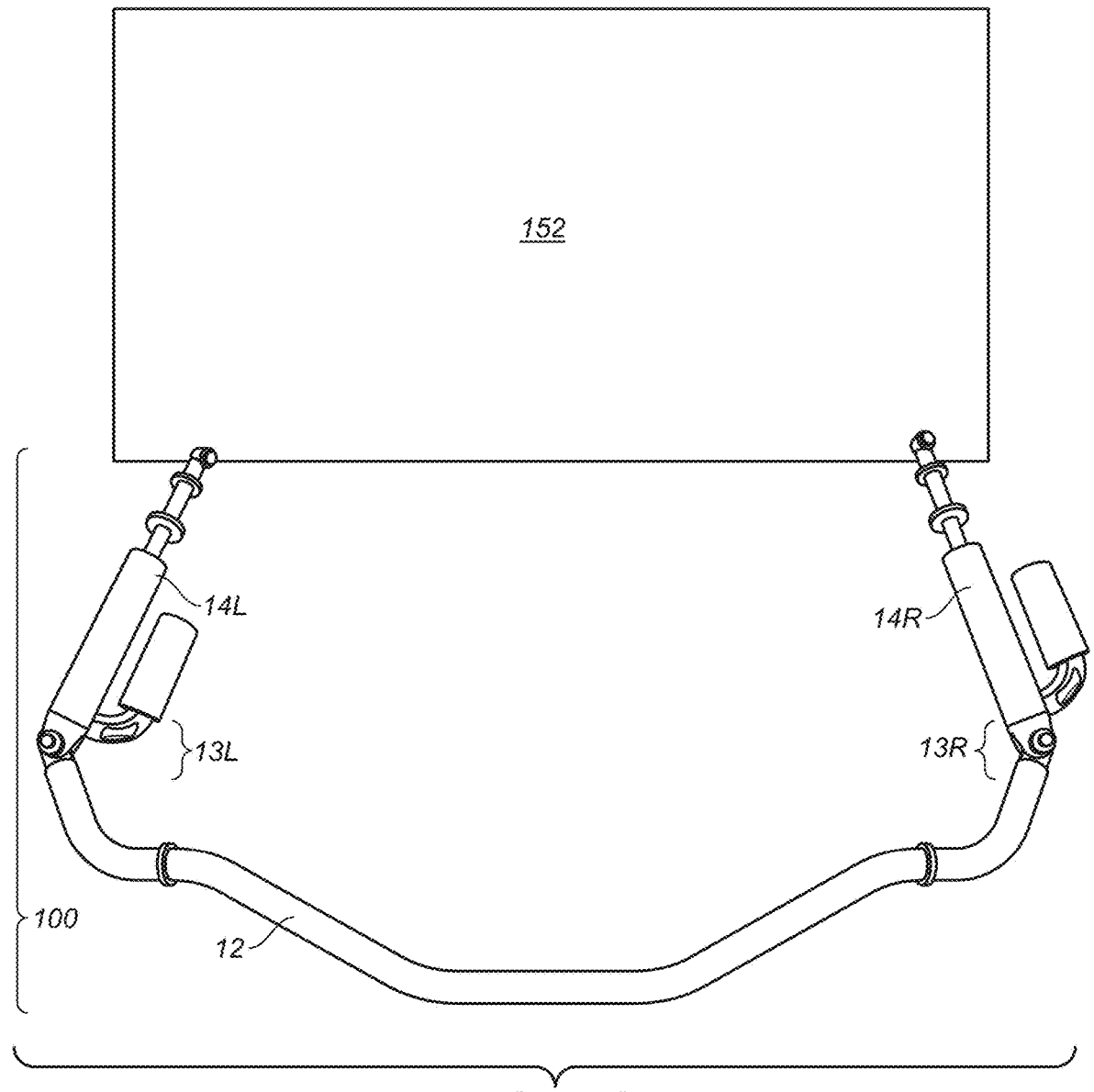
FIG. 1C is a perspective view of a sway bar system including two electronically controlled damper links coupled to a vehicle, in accordance with an embodiment.

Referring now to FIG. 1C, a perspective view is provided of sway bar system 100 having electronically controlled damper link 14L coupled to a first end of sway bar 12 at location 13L. In the embodiment of FIG. 1C, sway bar system 100 further includes electronically controlled damper link 14R coupled to a second end of sway bar 12 at location 13R. Additionally, as schematically depicted in FIG. 1C, in the embodiment, electronically controlled damper link 14L is coupled to vehicle 152, and electronically controlled damper link 14R is coupled to vehicle 152. In one embodiment, electronically controlled damper link 14L and electronically controlled damper link 14R are coupled to vehicle 152 at a location, for example, near a wheel or axle (such as coupled to a control arm or other suspension feature) of vehicle 152 at respective left and right sides of vehicle 152. It will be understood that when the left and right sides of the suspension of vehicle 152 move relative to one another, sway bar 12 of sway bar system 100 is subjected to torsion and forced to twist. The twisting of sway bar 12 will transfer forces between a heavily-loaded suspension side of vehicle 152 to the opposite, lesser-loaded, suspension side of vehicle 152.

Figure 1D:
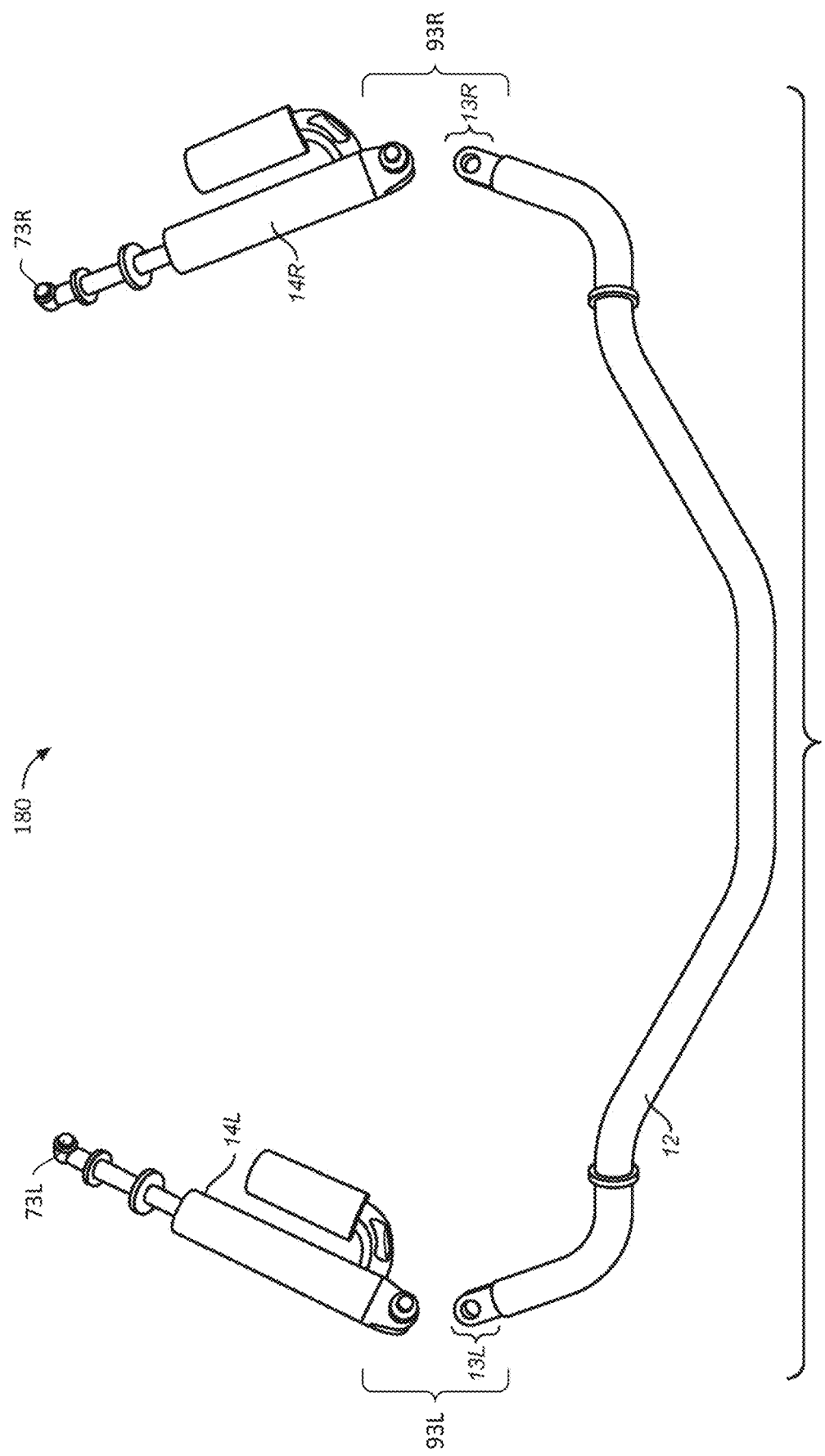
FIG. 1D is a perspective view of a sway bar system including at least one electronically controlled physical disconnect, in accordance with an embodiment.

Referring now to FIG. 1D, a perspective view of a sway bar system 180 including a sway bar 12, two electronically controlled damper links, e.g., electronically controlled damper link 14L and electronically controlled damper link 14R, and two electronically controlled physical disconnects, e.g., electronically controlled physical disconnect 93R and electronically controlled physical disconnect 93L, are shown in accordance with one embodiment. Although two electronically controlled physical disconnects are shown in FIG. 1D, it is appreciated that in another embodiment, sway bar 12 would have only a single electronically controlled physical disconnect, or a plurality of electronically controlled physical disconnect. Further, although two electronically controlled damper links are shown in FIG. 1D, it is appreciated that in another embodiment, sway bar 12 would have no electronically controlled damper links, one electronically controlled damper link, or a plurality of electronically controlled damper links.

For purposes of clarity, in FIG. 1D, electronically controlled damper link 14L and electronically controlled damper link 14R are shown slightly separated from sway bar 12 in order to more clearly depict the location of electronically controlled physical disconnect 93L, where electronically controlled damper link 14L would, in one embodiment, be physically coupled with, or physically disconnected from, sway bar 12 at connection 13L; and to more clearly depict the location of electronically controlled physical disconnect 93R, where electronically controlled damper link 14R would, in one embodiment, be physically coupled with, or physically disconnected from, sway bar 12 at connection 13R.

In one embodiments of sway bar system 180, electronically controlled physical disconnect 93L includes a linear actuator, rotary actuator, or other electronically controllable coupling feature (similar in functionality to the solenoid valve operation disclosed in remotely controllable active valve 200), to allow electronically controlled damper link 14L to be physically coupled with and physically disconnected from, sway bar 12 at connection 13L. Similarly, in one embodiments of sway bar system 180, electronically controlled physical disconnect 93R includes a linear actuator, rotary actuator, or other electronically controllable coupling feature (similar in functionality to the solenoid valve operation disclosed in remotely controllable active valve 200), to allow electronically controlled damper link 14R to be physically coupled with and physically disconnected from, sway bar 12 at connection 13R. It should be noted that in one embodiment, sway bar system 180 is not limited solely to the use of a bushing for electronically controlled physical disconnect 93L or electronically controlled physical disconnect 93R.

With reference still to FIG. 1D, in one embodiment of sway bar system 180, a portion of electronically controlled damper link 14L includes an eyelet 73L, or similar coupling feature, to readily enable coupling of electronically controlled damper link 14L to a location on a vehicle. Similarly, in one embodiment of sway bar system 180, a portion of electronically controlled damper link 14R includes an eyelet 73R, or similar coupling feature, to readily enable coupling of electronically controlled damper link 14R to a location on a vehicle. It should be noted one embodiment of sway bar system 180 uses a connection other than an eyelet for coupling one or both of electronically controlled damper link 14L and electronically controlled damper link 14R to a vehicle.

In one embodiment, the electronically controlled physical disconnect 93L (or electronically controlled physical disconnect 93R) is a portion of electronically controlled damper link 14L (or electronically controlled damper link 14R, respectively).

In one embodiment, electronically controlled physical disconnect 93L (or electronically controlled physical disconnect 93R) is a portion of electronically controlled damper link 14L (or electronically controlled damper link 14R, respectively) located at an opposite end of the eyelet 73L (or eyelet 73R, respectively) portion of electronically controlled damper link 14L (or electronically controlled damper link 14R, respectively).

Although, in one embodiment, sway bar system 180 is disclosed as having two electronically controlled damper links and two electronically controlled physical disconnects, it should be appreciated that other embodiments of sway bar system 180 would include a different number of electronically controlled damper links and/or electronically controlled physical disconnects, such as a single electronically controlled physical disconnect, or a plurality of electronically controlled physical disconnect, no electronically controlled damper links, one electronically controlled damper link, or a plurality of electronically controlled damper links, and the combinations therefrom as discussed in some of the examples below. Further, it should be understood that the following embodiments are provided for clarity, and are not meant to be exhaustive. Instead, one or more embodiments could include other configurations, additional electronically controlled damper links and/or electronically controlled physical disconnects which may be located at different locations along sway bar 12, and the like.

For example, in one embodiment, sway bar system 180 includes only a single electronically controlled damper link (e.g., electronically controlled damper link 14L or electronically controlled damper link 14R), and both of electronically controlled physical disconnect 93R and electronically controlled physical disconnect 93L. In one example of such an embodiment, electronically controlled damper link 14L is used at one end of sway bar 12 such as to couple with connection 13L, and a conventional end link (or the like) is coupled to the other connection 13R. Hence, sway bar system 180 is well suited to embodiments in which one end of sway bar 12 has an electronically controlled damper link (e.g., electronically controlled damper link 14L or electronically controlled damper link 14R) coupled thereto, and also to embodiments in which both ends of sway bar 12 have an electronically controlled damper link (e.g., electronically controlled damper link 14L and electronically controlled damper link 14R) coupled thereto.

In one embodiment, sway bar system 180 includes only a single electronically controlled damper link (e.g., electronically controlled damper link 14L or electronically controlled damper link 14R), and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and a conventional end link (or the like) is coupled to the other connection 13R without an electronically controlled physical disconnect 93R.

In another embodiment, electronically controlled damper link 14L is used at one end of sway bar 12 such as to couple with connection 13L without an electronically controlled physical disconnect 93L, and a conventional end link (or the like) is coupled to the other connection 13R having electronically controlled physical disconnect 93R.

In one embodiment, sway bar system 180 includes both electronically controlled damper link 14L and electronically controlled damper link 14R, and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and electronically controlled damper link 14R is coupled to the other connection 13R without an electronically controlled physical disconnect 93R.

In another example of such an embodiment, electronically controlled damper link 14L is used at one end of sway bar 12 such as to couple with connection 13L via without an electronically controlled physical disconnect 93L, and electronically controlled damper link 14R is coupled to the other connection 13R via electronically controlled physical disconnect 93R.

As such, sway bar system 180 is well suited to embodiments in which one or both ends of sway bar 12 have an electronically controlled damper links coupled thereto, and also to embodiments in which one or both ends of sway bar 12 are coupled to one or more electronically controlled damper links (and/or a conventional end link) via one or both of electronically controlled physical disconnects.

For purposes of conciseness and clarity, portions of the following description may refer to the electronically controlled physical disconnect as "electronically controlled physical disconnect 93", instead repeating the same description for each of electronically controlled physical disconnect 93L and electronically controlled physical disconnect 93R. It should be noted that such portions of the description are applicable to either electronically controlled physical disconnect 93L or electronically controlled physical disconnect 93R, as shown in sway bar system 180 of FIG. 1D. Further, the description will pertain to embodiments in which one or both ends of sway bar 12 have electronically controlled physical disconnects coupled therewith, and also to embodiments in which one or both ends of sway bar 12 are coupled to one or more electronically controlled damper links (and/or a conventional end link) via one or both of electronically controlled physical disconnects.

Referring now to FIG. 2A, a cutaway schematic view 11 of electronically controlled damper link 14 in a state of compression is shown, in accordance with one embodiment. Referring also to FIG. 2B, a cutaway schematic view 41 of electronically controlled damper link 14 in a state of rebound is shown, in accordance with one embodiment. As FIG. 2A and FIG. 2B are similar, other than their state of operation (compression in FIG. 2A and rebound in FIG. 2B), the components of FIG. 2A and FIG. 2B will be discussed at the same time. However, it should be appreciated that various fluid flow through various valves and components of electronically controlled damper link 14 may be in an opposite direction in FIG. 2A when compared to FIG. 2B. Further, it will be understood that the location of certain "inlet valves" or "outlet valves", and the applicability of terms such as "inlet" or "outlet", and the like, as applied to the various valves and/or components, may vary in FIG. 2A when compared to FIG. 2B.

Referring again to FIG. 2A and also to FIG. 2B, electronically controlled damper link 14 includes a damper cylinder 28 with a shaft 24 and a damping piston 25. As shown, in FIG. 2A, shaft 24 and damping piston 25 are coupled to each other. It will be understood that, typically, damper cylinder 28 encloses a damper cylinder chamber (sometimes referred to as the damper cylinder volume). It will further be understood that damping piston 25 and shaft 24 are, typically, movable into and out of the damper cylinder chamber and that damping piston 25 and shaft 24 move axially with respect to damper cylinder 28. Damper cylinder 28 is typically at least partially filled with a damping fluid. As will be understood, during operation of the damper, the damping fluid is metered from one side of damping piston 25 to the other side by passing through valve flow opening 22 traversing through valve 200 (which is described in detail below) and, optionally, through openings in digressive piston 23. In one such embodiment, openings are formed in damping piston 25. It should be noted that for purposes of clarity, valve 200 is depicted schematically in FIG. 2A, FIG. 2B, FIG. 3A and FIG. 3B. A detailed illustration of at least one embodiment of valve 200 is provided at FIG. 5, FIG. 6, and FIG. 7. Similarly, a detailed description of at least one embodiment of valve 200 is provided below and in conjunction with the discussion of FIG. 5, FIG. 6, and FIG. 7. Additionally, although valve 200 is referred to as a single valve, embodiments are also well suited to the use of more than one valve to comprise "valve 200". For purposes of brevity and clarity, however, the discussion will refer to a valve 200 as a single valve.

In embodiments of sway bar system 100 and sway bar system 180, fluid flow through various openings within the electronically controlled damper 14 is restricted using, for example, shims which partially obstruct the flow paths in each direction in digressive piston 23 and also available flow paths in damping piston 25. By selecting shims having certain desired stiffness characteristics, the dampening effects caused by digressive piston 23 can be increased or decreased and dampening rates can be different between the compression and rebound strokes of damping piston 25. For example, the shims are configured to meter rebound flow from the rebound portion of the to the compression portion of damper cylinder 28, or to meter compression flow from the compression portion of damper cylinder 28 to the rebound portion. Embodiments described herein are well suited to metering fluid flow during compression, during rebound, or during both compression and rebound.

A fluid reserve cylinder 211 is in fluid communication with the damper cylinder 28 for receiving and supplying damping fluid as shaft 24 moves in and out of damper cylinder 28. Fluid reserve cylinder 211 is in fluid communication with damper cylinder 28 via a fluid path 32. As illustrated, for example, in FIG. 2A and FIG. 2B, fluid reserve cylinder 211 at least partially encloses a fluid reservoir chamber 26 and a gas chamber 27. As also shown in FIG. 2A and FIG. 2B, fluid reserve cylinder 211 also includes and encloses an internal floating piston (IFP) 33. IFP 33 is disposed within fluid reserve cylinder 211 and movably and fluidly separates fluid reservoir chamber 26 and gas chamber 27. IFP 33 can be described as having gas chamber 27 on the "backside" thereof (sometimes referred to as the "blind end" of IFP 33). Additionally, IFP 33 can also be described as having fluid reservoir chamber 26 on the "frontside" thereof.

With reference still to FIG. 2A and FIG. 2B, it will be understood that gas within gas chamber 27 is compressible as fluid reservoir cylinder 26 (on the "frontside" of IFP 33) fills with damping fluid due to movement of shaft 24 and damping piston 25 into damper cylinder 28. Certain features of reservoir-type dampers are shown and described in U.S. Pat. No. 7,374,028, which is incorporated herein, in its entirety, by reference. As described above, in various embodiments, sway bar system 100 and sway bar system 180 will have an upper portion of electronically controlled damper 14 coupled to sway bar 12 through the use of a bushing. Similarly, in various embodiments, a lower portion of upper portion of electronically controlled damper 14 (e.g., a portion of shaft 24 (opposite damping piston 25) which extends outside of damper cylinder 28) is supplied with an eyelet 29 to readily enable coupling of electronically controlled damper 14 to a part of the vehicle. As a result, as shaft 24 and damping piston 25 move into damper cylinder 28 (e.g., during compression), depending upon the setting of the valve 200, the damping fluid can control the relative speed of movement between sway bar 12 and the vehicle mounting location. Specifically, the incompressible damping fluid moving through the various flow paths provided in the damping piston 25 and/or the metered bypass 44 (see for example FIGS. 3A and 3B), as will be described herein, can be used to control the damping characteristics of electronically controlled damper 14. In one example, as shaft 24 and damping piston 25 move out of the damper cylinder 28 (e.g., during extension or "rebound") damping fluid is metered through the flow path 32, valve flow opening 22, and valve 200, and the flow rate and corresponding stiffness of electronically controlled damper 14 is thereby controlled. Once again, it should be noted that embodiments are well suited to metering fluid flow during compression, during rebound, or during both compression and rebound. Further, it should be noted that embodiments are also well suited to various other structures and arrangements including, but not limited to, main piston damping, piston bypass configurations, and various other damper configurations.

Figure 3B:
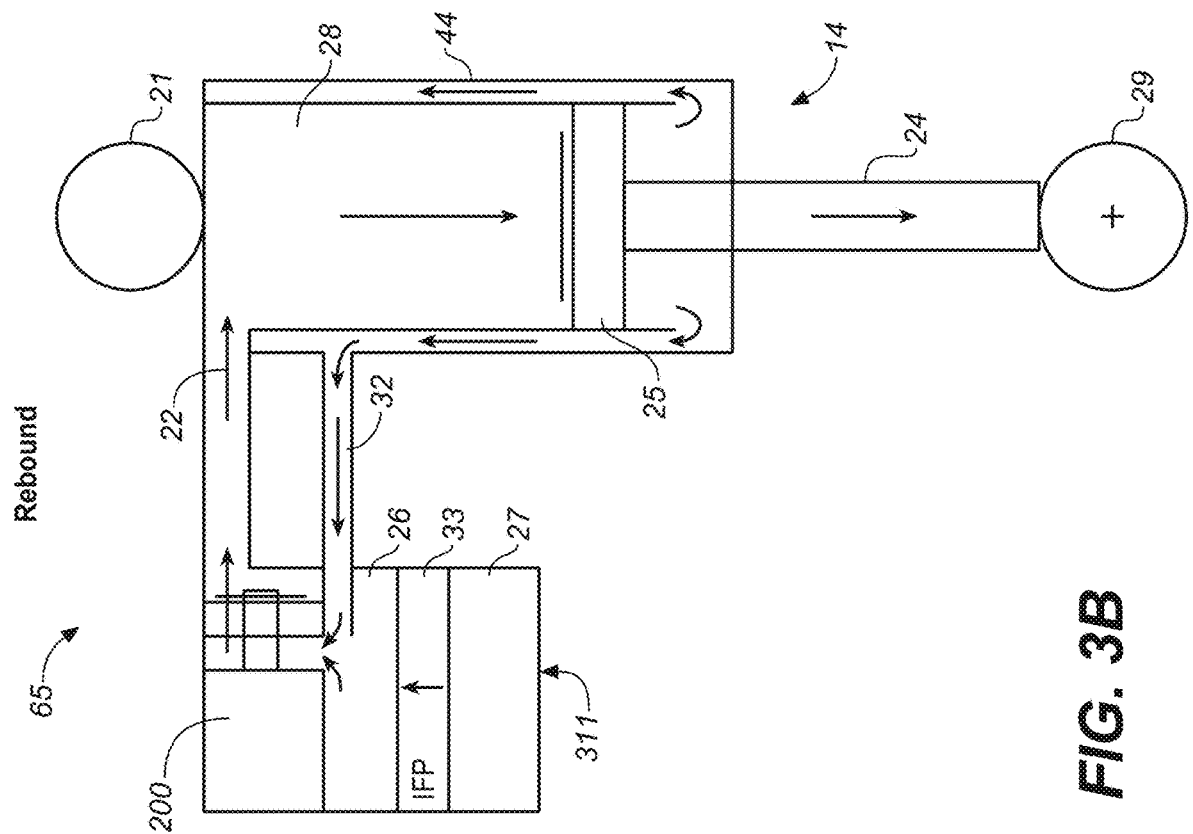
FIG. 3B is a cutaway schematic view of a twin tube electronically controlled damper link in rebound, in accordance with an embodiment.
Figure 3A:
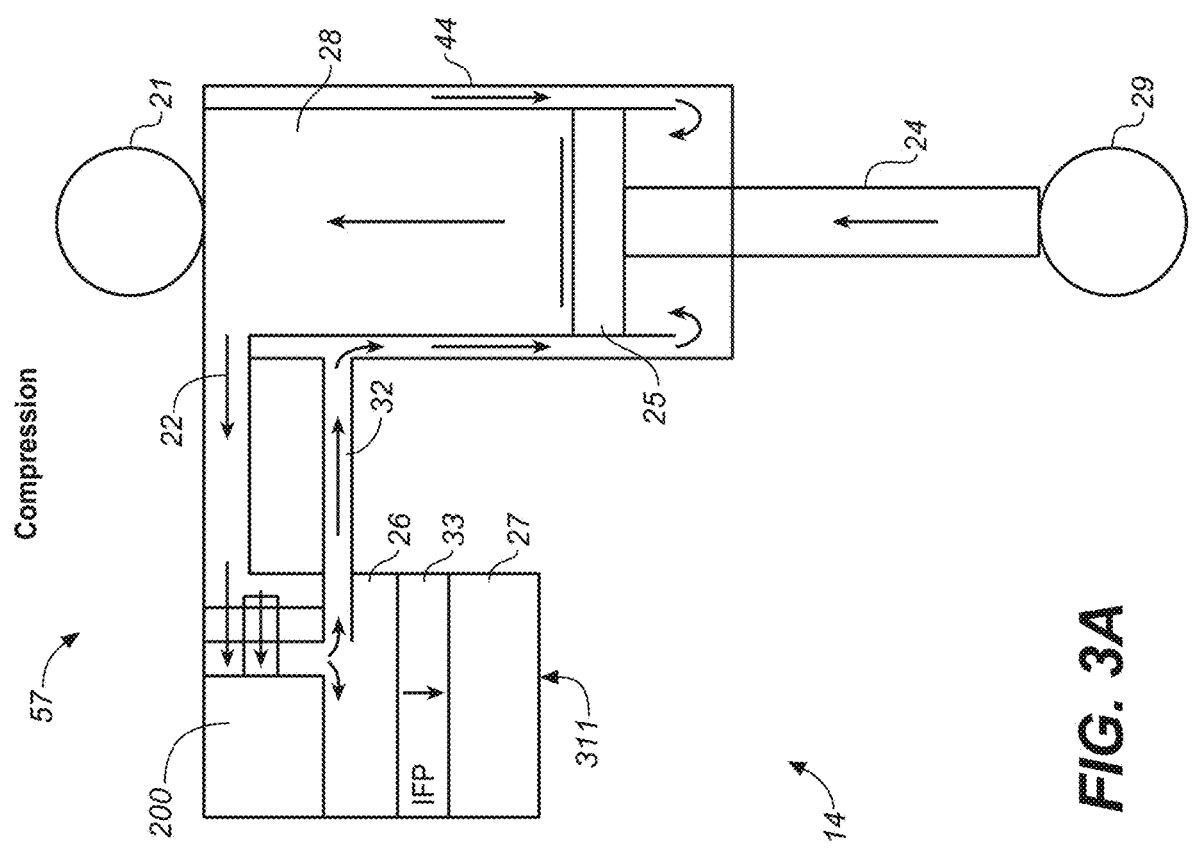
FIG. 3A is a cutaway schematic view of a twin tube electronically controlled damper link in compression, in accordance with an embodiment.

Referring now to FIG. 3A, a cutaway schematic view 57 of a twin tube electronically controlled damper link 14 in a compression state is shown in accordance with one embodiment. Similarly, as above, FIG. 3B is a cutaway schematic view 65 of a twin tube electronically controlled damper link 14 in a rebound state is shown in accordance with one embodiment. As such, the components of FIGS. 3A and 3B will be discussed at the same time (and those components that overlap with FIG. 2A or 2B will not be re-addressed). However, it should be appreciated that the fluid flow through valve 200 will be in the opposite direction when comparing FIGS. 3A and 3B. Thus, for example, there may be an inlet valve in one location, and an outlet valve at different location, or a valve that can operate as both an inlet and an outlet.

In general, the twin tube structure, of FIG. 3A and FIG. 3B, allows the bypass 44 to provided fluid connectivity between the lower portion of damper cylinder 28 below damping piston 25 and the upper portion of damper cylinder 28 above damping piston 25 (as oriented).

In one embodiment, the valve 200 is a remotely and electronically controlled valve. In one such embodiment, the control of valve 200 is made from a remote location such as in the cab of the vehicle to which sway bar system 100 and/or sway bar system 180 is coupled.

As will be described in detail below, valve 200 of electronically controlled damper link 14 allows for fast acting, proportional changes to compression and/or rebound damping rates. Moreover, the damping of electronically controlled damper link 14 can vary from fully locked out to a compliant state. Thus, electronically controlled damper link 14 replaces a conventional end link. By providing fast acting, proportional changes to compression and rebound damping, electronically controlled damper link 14 is significantly superior in performance and operation to a conventional end link device.

Furthermore, electronically controlled damper link 14 enables the stiffness or compliance of sway bar system 100 and/or sway bar system 180 to be remotely controlled by controlling the stiffness or compliance of electronically controlled damper link 14. For example, in one embodiment, electronically controlled damper link 14 will, for example, increase its dampening, and, correspondingly, increase the stiffness of sway bar system 100 and/or sway bar system 180. In one embodiment, such increased stiffness of sway bar system 100 and/or sway bar system 180 is advantageous, for example, during cornering, as vehicle speed rises, when vehicle roll is detected, and the like.

Conversely, in one embodiment, electronically controlled damper link 14 will, for example, decrease its dampening, and, correspondingly, decrease the stiffness of sway bar system 100 and/or sway bar system 180. In one embodiment, such decreased stiffness of sway bar system 100 and/or sway bar system 180 is advantageous, for example, for rough terrain, slow speeds, rock crawling, and the like.

Moreover, in various embodiments of sway bar system 100 and/or sway bar system 180, adjustments are made to electronically controlled damper link 14 to obtain a stiff or soft sway bar feel, wherein such a "sway bar feel" is selectable by the rider and/or driver of the vehicle to which sway bar system 100 and/or sway bar system 180 is coupled. Additionally, in various embodiments of sway bar system 100 and/or sway bar system 180, settings are used to control understeer/oversteer, etc. For example, there may be a number of presets that an operator of the vehicle, to which sway bar system 100 and/or sway bar system 180 is coupled, can select to adjust the damping characteristics of electronically controlled damper link 14 based on the terrain being covered, the speed being driven, and the like. Further, in various embodiments of the sway bar system, such presets are selectable and changeable on the fly, e.g., throughout a drive, without the operator having to stop the vehicle.

Figure 3C:
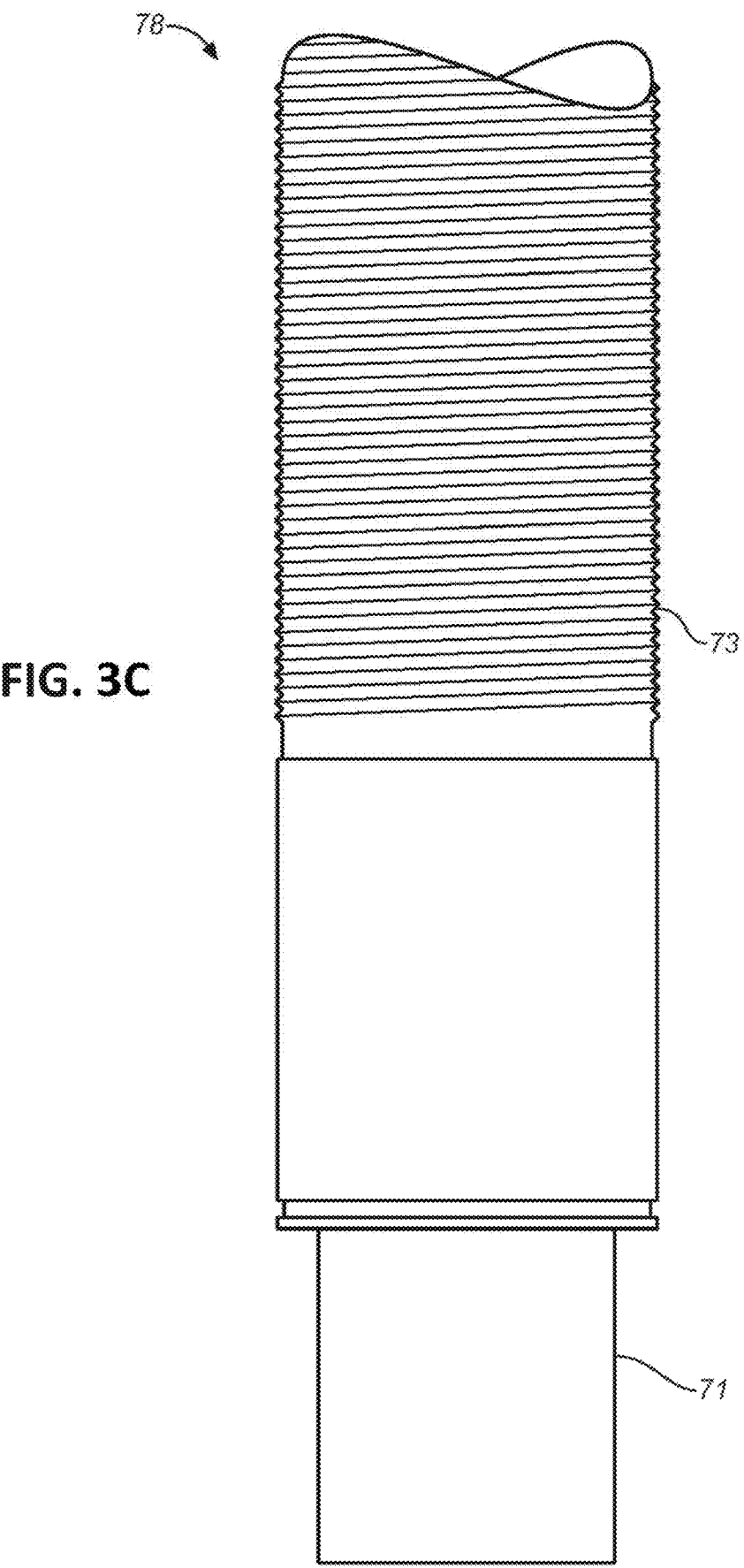
FIG. 3C is a perspective view of an inner body portion of a first damper cylinder within a larger outer body portion of a second damper cylinder, in accordance with an embodiment.

Referring now to FIG. 3C (and also to FIG. 1A), as stated above, in embodiments of sway bar system 100 and/or sway bar system 180, the diameter of damper cylinder 28 is reduced. By reducing the diameter of damper cylinder 28, the damper cylinder volume corresponding to damper cylinder 28 is also reduced. Hence, changes in the diameter of damper cylinder 28 ultimately alter the ratio between the damper cylinder volume of damper cylinder 28 and the flow area of, for example, valve 200. In FIG. 3C (and also referring to FIG. 2A and FIG. 2B), a perspective view 78 of an inner body portion of a first damper cylinder 71 within a larger outer body portion of a second damper cylinder 73 is shown in accordance with one embodiment. In other words, the damper cylinder diameter 30 of damper cylinder 28 is reduced by fitting a smaller damper cylinder (e.g., first damper cylinder 71) inside of the larger damper cylinder (e.g., second damper cylinder 73). A new body cap and seal head is then used to attach damper cylinder 71 and damper cylinder 73.

In one embodiment, shaft size 19 of shaft 24 is also reduced. The change in damper cylinder diameter 30 changes the ratio between damper cylinder volume and the flow area of valve 200. For example, when valve 200 remains the same and damper cylinder volume is decreased, electronically controlled damper link 14 will have a softer decoupled setting. In various embodiments of sway bar system 200, the ratio of damper cylinder volume of damper cylinder 28 to the flow area of valve 200 can be tuned by changing one or both of damper cylinder volume and the flow area of valve 200.

Figure 4:
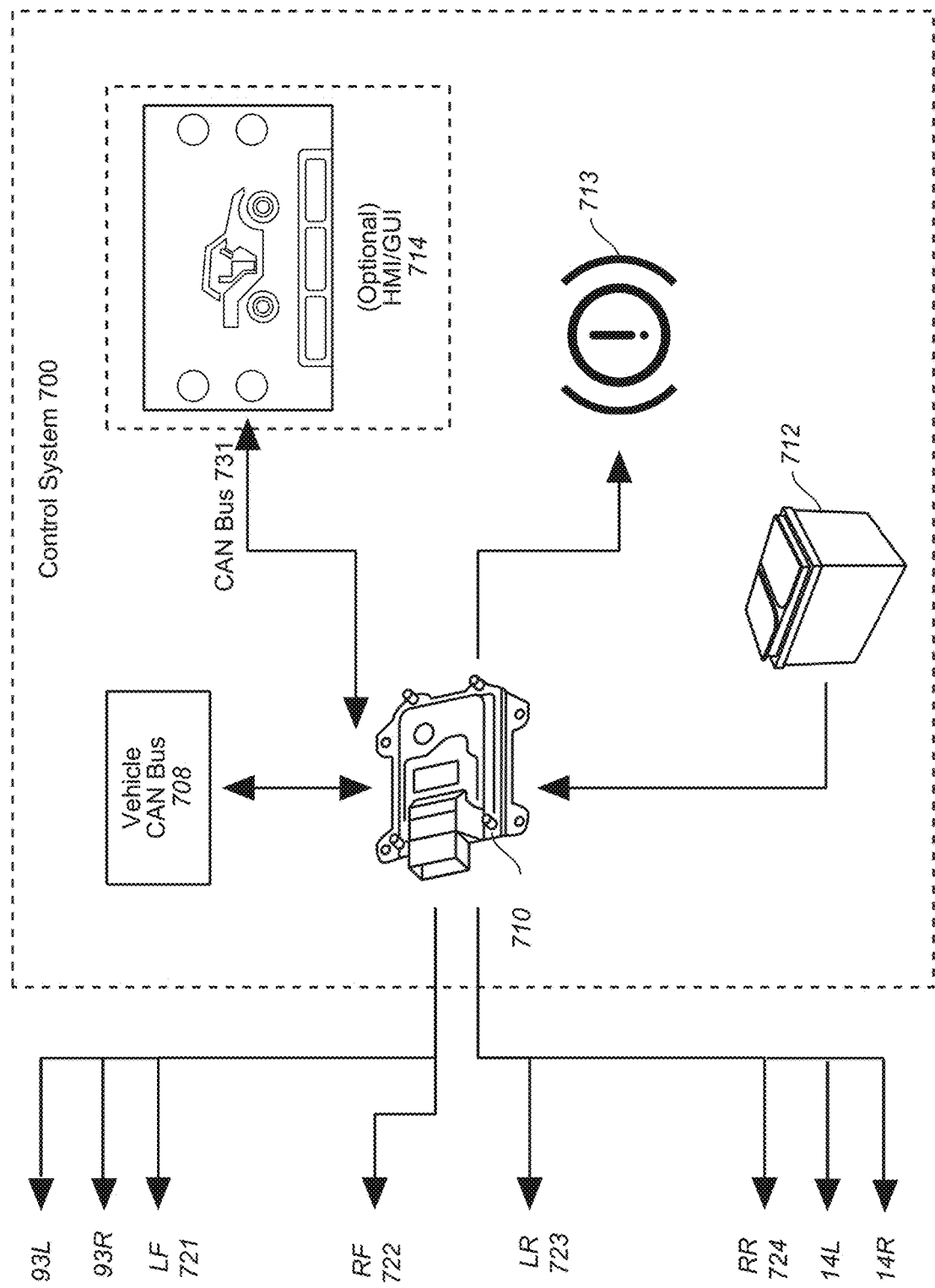
FIG. 4 is a block diagram of a modular active damping control system, shown in accordance with an embodiment.

Referring now to FIG. 4, a block diagram of a modular active damping control system 700 is shown in accordance with an embodiment. Modular active damping control system 700 includes a plurality of damping components including front and rear dampers (hereinafter dampers 721-724), two electronically controlled damper links 14L and 14R, two electronically controlled physical disconnects 93L and 93R, and a control system 700.

In one embodiment, there is at least one damper, of the plurality of dampers 721-724 located at each of a vehicle wheel suspension location. For example, damper 721 at the left front, damper 722 at the right front, damper 723 at the left rear, and damper 724 at the right rear.

In one embodiment, there is at least one electronically controlled damper link, of the plurality of electronically controlled damper links 14L and 14R coupled with the sway bar 12. For example, electronically controlled damper link 14L at the left sway bar 12 connection and/or electronically controlled damper link 14R at the right sway bar 12 connection.

In one embodiment, there is at least one electronically controlled physical disconnect, of the plurality of electronically controlled physical disconnects 93L and 93R coupled with the sway bar 12. For example, in one embodiment, the electronically controlled physical disconnect 93L is at the left sway bar 12 connection and/or the electronically controlled physical disconnect 93R is at the right sway bar 12 connection. In one embodiment, one or both of the electronically controlled physical disconnects 93L and 93R are part of one or both of the electronically controlled damper links 14L and 14R, respectively.

In one embodiment, the plurality of damping components, e.g., dampers 721-724 and electronically controlled damper links 14L and 14R, are selected from the damper types such as, an in-line damper, a piggyback damper, a compression adjust only damper, a rebound adjust only damper, an independent compression and rebound adjust damper, a dependent compression and rebound adjust single valve damper, and the like.

Although active damping control system 700 is shown as interacting with four dampers 721-724, two electronically controlled damper links 14L and 14R, and two electronically controlled physical disconnects 93L and 93R, such as would be found in one embodiment of a four wheeled vehicle suspension configuration, it should be appreciated that the technology is well suited for application in other vehicles with different suspension configurations or in similar vehicles with different numbers of electronically controlled components. The different configurations can include two-wheel suspension configuration like that of a motorcycle; a one, two or three "wheel" suspension configuration like that of a snowmobile, trike, or boat, a plurality of dampers at each of the damper suspension locations such as found in off-road vehicles, UTV, powersports, heavy trucking, RV, agriculture, maritime, and the like. The use of dampers in a four-wheel suspension location configuration as shown herein is provided merely as one example.

In one embodiment, control system 700 includes shimmed damping control (SDC) 710, vehicle CAN bus 708, CAN Bus 731 to an optional human machine interface (HMI) 714 (or graphical user interface (GUI)), warning 713, and battery 712. It should be appreciated that in an embodiment, one or more components shown within control system 700 would be located outside of control system 700, and similarly additional components would be located within control system 700.

In one embodiment, SDC 710 includes a processor. In operation, both compression and rebound oil flows through independent sophisticated multistage blended circuits in SDC 710 to maximize suspension control. In one embodiment, SDC 710 will control each of the plurality of damping components coupled with the vehicle suspension, determine a type of damping component coupled with the vehicle suspension, automatically tune a vehicle suspension based on the determined type of damping components coupled with the vehicle suspension, automatically monitor one or more of the plurality of damping components and determine when a change has been made to one or more of the plurality of damping components, and automatically re-tune one or more of the damper settings of the vehicle suspension based on the change to one or more of the plurality of damping components.

In one embodiment, there is no need for HMI/GUI 714 within the modular active damping control system 700. Instead, the suspension configuration will be identified by the warning 713 or lack thereof. In another embodiment, there may be suspension configuration switches instead of an HMI/GUI 714.

In one embodiment, optional HMI/GUI 714 presents damping configuration and operational information about the damping configuration, e.g., vehicle suspension settings, sway bar settings, and the like, in a user interactive format, such as on a display located proximal to a vehicle operator. In one embodiment, HMI/GUI is also programmable to present damping configuration information, rebound configuration information and/or suspension setting information in a user interactive format on a display.

In one embodiment, optional HMI/GUI 714 is configured to present vehicle suspension setting information in a user interactive format on a display, where the HMI/GUI will have a touch input capability to receive an input from a user via a user interaction with the HMI/GUI wherein said input from said user is an adjustment/modification to one or more of the pluralities of damping components (dampers 721-724, electronically controlled damper links 14L and 14R, and electronically controlled physical disconnects 93L and 93R).

In one embodiment, the vehicle suspension setting information includes a plurality of different vehicle suspension mode configurations and an identification of which configuration mode is currently active on the vehicle suspension. In one embodiment, the plurality of different vehicle suspension mode configurations is user selectable.

If one or more of the components of dampers 721-724, electronically controlled damper links 14L and 14R, and electronically controlled physical disconnects 93L and 93R are automatically adjustable, in one embodiment, control system 700 will automatically adjust one or more of the pluralities of damping components (dampers 721-724, electronically controlled damper links 14L and 14R, and electronically controlled physical disconnects 93L and 93R) of the tuned vehicle suspension based on external conditions such as, weather, terrain, ground type (e.g., asphalt, concrete, dirt, gravel, sand, water, rock, snow, etc.), and the like.

In one embodiment, control system 700 will automatically adjust one or more of the pluralities of damping components (dampers 721-724, electronically controlled damper links 14L and 14R, and electronically controlled physical disconnects 93L and 93R) of the tuned vehicle suspension based on one or more sensor inputs received from sensors such as an inertial gyroscope, an accelerometer, a magnetometer, a steering wheel turning sensor, a single or multi spectrum camera, and the like. In one embodiment, the vehicle may include one or more suspension components, sensors, and the like, such as disclosed in U.S. Pat. No. 10,036,443 the content of which is incorporated by reference herein, in its entirety.

In one embodiment, the active damping control system 700 characteristics can be set at the factory, manually adjustable by a user, or automatically adjustable by a computing device using environmental inputs and the like. For example, in one embodiment, some or all of the suspension characteristics for the dampers 721-724, electronically controlled damper links 14L and 14R, and electronically controlled physical disconnects 93L and 93R are automatically adjustable based on user preference, speed, maneuvering, ride type, or the like.

In one embodiment, some of the suspension characteristics for the dampers 721-724, electronically controlled damper links 14L and 14R, and electronically controlled physical disconnects 93L and 93R are manually adjustable based on user preference, speed, maneuvering, ride type, or the like.

In one embodiment, the adjustable characteristics for some or all of the dampers 721-724, electronically controlled damper links 14L and 14R, and electronically controlled physical disconnects 93L and 93R are automatically adjustable via a manual user input into the active damping control system 700. For example, via user interaction with HMI/GUI 714.

In one embodiment, the adjustable characteristics for some or all of the dampers 721-724, electronically controlled damper links 14L and 14R, and electronically controlled physical disconnects 93L and 93R are automatically adjusted based on external conditions, e.g., sensors detecting damper, vibration, or the like. For example, in a smooth operating environment, e.g., on a highway or smooth road, configuration adjustments may be provided by the user via HMI 714, or automatically applied by active damping control system 700, to increase firmness in the ride. That is, to provide additional hardness that would increase feedback, feel and precise handling.

In contrast, when rougher terrain is encountered, the user can select a rough terrain setting at HMI 714. In one embodiment, instead of user selection, the active damping control system 700 would receive information from one or more sensors (coupled to the suspension near dampers 721-724, via the Vehicle CAN bus 708, or the like) about the rough terrain and automatically re-tune the vehicle suspension based on the received sensor inputs. That is, to provide appropriate suspension control characteristics for the vehicle. In addition, the adjustment provides a softer ride that would reduce operator/passenger felt vibrations, damper, bumps, and the like thereby reducing operator fatigue and/or the like.

As described herein, the manual input option includes a user selectable switch, icon on a touch display, or the like at the GUI or HMI, that allows a user to make a selection based on given characteristics, e.g., highway mode-for smooth terrain, -off-road mode-for rough terrain, a mixed mode for intermediate terrain, etc. In one embodiment, the manual option is provided at the GUI or HMI. In one embodiment, the manual option may be one or more switches that allow the use to select one or more pre-defined suspension settings. For example, the pre-defined suspension settings can include, but are not limited to, highway, offroad, mixed terrain, rock climbing, racing, performance, sport, wet, and the like. Further discussion and examples of a control system are described in U.S. Pat. No. 10,933,710, the content of which is incorporated by reference herein, in its entirety.

In one embodiment, the HMI/GUI may be part of an in-vehicle infotainment (IVI) system integrated with the vehicle structure and one or more of the suspension components, suspension component controller(s) and data processing system as described in U.S. Pat. Nos. 4,773,671; 4,984,819; 5,027,303; 5,105,918; 5,390,949; 6,244,398; 6,427,812; 6,863,291; and 6,935,157; the content of which are incorporated by reference herein, in their entirety. Further, the IVI system could incorporate vehicle systems consisting of one or more sensor(s), imagers, active valves, active damping components, suspension system controllers and the like. Further, the principles of patents and other documents incorporated herein by reference, may be integrated one or more embodiments hereof, individually or in combination, as disclosed herein.

In an automated mode, active damping control system 700 automatically adjusts one or more characteristics for one or more of the dampers 721-724, electronically controlled damper links 14L and 14R, and electronically controlled physical disconnects 93L and 93R based on one or more inputs received at the processor of SDC 710. For example, in one embodiment, the steering inputs, vehicle roll, speed, and the like are detected and/or monitored via one or more sensors on or about the vehicle. Similarly, external conditions such as weather, terrain, ground type, and the like are also detected and/or monitored via the one or more sensors on or about the vehicle.

Sensors such as but not limited to, accelerometers, sway sensors, suspension changes, visual identification technology (e.g., single or multi spectrum camera's), driver input monitors, steering wheel turning sensors, and the like. For example, one embodiment uses an inertial measurement unit (IMU) to sense rough terrain. One embodiment has an attitude and heading reference system (AHRS) that provides 3D orientation integrating data coming from inertial gyroscopes, accelerometers, magnetometers, and the like. For example, in one embodiment, the AHRS is a GPS aided Microelectromechanical systems (MEMS) based IMU and static pressure sensor.

Moreover, if the active damping control system 700 determines that one or more of some dampers 721-724, electronically controlled damper links 14L and 14R, and electronically controlled physical disconnects 93L and 93R are remotely adjustable, active damping control system 700 will be able to adjust those dampers (e.g., remotely controllable valve 200) automatically and on the fly. For example, active damping control system 700 will set the remotely adjustable dampers of the sway bar into a highway mode during travel down a roadway, e.g., that is configuring the remotely adjustable electronically controlled damper links 14L and 14R, and electronically controlled physical disconnects 93L and 93R to place the sway bar 12 in a firmer mode, and then as the vehicle transitions to rougher terrain, the remotely adjustable electronically controlled damper links 14L and 14R, and electronically controlled physical disconnects 93L and 93R will be reconfigured to a softer setting to increase suspension articulation and thereby provide a more capable off-road suspension.

In one embodiment, the automated or user selectable settings are further adjustable based on actual conditions or as "learned" user settings. For example, if an operator initially sets the active damping control system 700 to a rough terrain setting and then the vehicle transitions to a roadway, fire road, highway, or the like. When the sensor feedback causes the active damping control system 700 to determine that the vehicle is no longer in rough terrain, active damping control system 700 would automatically change the mode to highway mode to provide more appropriate suspension setting to one or more of the dampers 721-724, electronically controlled damper links 14L and 14R, and electronically controlled physical disconnects 93L and 93R. However, if the operator prefers a harder feel, the operator will override any automatic "on-the-fly" adjustments so that off-road mode is maintained. Similarly, if the user prefers a softer ride, or has been in the seat for a long period of time, the user will adjust the stiffness mode to be a softer seat, provide a smoother ride, or the like.

As stated herein, in one embodiment a "soft" or even physically disconnected sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection capability of the sway bar from the suspension as shown in FIG. 1D will provide additional performance enhancements and capabilities during slow maneuvering such as rock crawling, 4-wheeling, and other slower driving/obstacle clearing activities where maximum suspension articulation is desired, needed, and/or warranted.

In one embodiment, a physically connected but "soft" or range of softer settings of a connected sway bar system provides increased handling and body roll control during normal speed cornering and various driving activities. In one embodiment, the physically connected soft to medium range setting of the sway bar system provides performance distinctions in various conditions such as normal speed driving, faster speed driving, or driving in a location or conditions that are not rock crawling and other slower driving/obstacle clearing activities, e.g., in locations where maximum suspension articulation is not more important than ensuring the vehicle does not go out of control, tip over due to body roll, or the like.

In one embodiment, a "hard" or range of harder settings from medium stiffness to all the way locked out, of a connected sway bar system will provide increased handling and body roll control during high-speed cornering and various racing activities.

For example, active valve sway bar settings, firmness levels, and adjustability is used to provide an almost infinite number of settings and levels for electronically controlled damper links 14L and 14R, and/or electronically controlled physical disconnects 93L and 93R, which then provide an optimized sway bar 12 characteristic for a particular feel, particular condition, particular obstacle, particular performance, and the like.

In one embodiment, a configuration file is used to store all configurable settings associated with the operation of electronically controlled damper links 14L and 14R, and electronically controlled physical disconnects 93L and 93R. It is a text file formatted as a YAML (a recursive acronym for "YAML Ain't Markup Language") file. These settings files are used by various programs to (1) program or "flash" settings to the controller's flash memory or (2) read out and save controller settings to a file.

In one embodiment, each of electronically controlled damper links 14L and 14R may be electrically connected with a linear switch (such as that which operates an automotive brake light) that is activated in conjunction with the vehicle brake. When the brake is moved beyond a certain distance, corresponding usually to harder braking and hence potential for vehicle nosedive, the electric switch connects a power supply to a motive force generator that causes the remotely controllable active valve 200 within electronically controlled damper links 14L and 14R to automatically close or partially close the fluid paths.

In so doing, the stiffness of electronically controlled damper links 14L and 14R will be increased. As such, the sway bar 12 connection with the vehicle suspension will become more rigid during hard braking. Other mechanisms may be used to modify the softness or firmness of electronically controlled damper links 14L and 14R such as accelerometers (e.g., tri-axial) for sensing pitch and roll of the vehicle and activating, via a microprocessor, the appropriate input to cause the remotely controllable active valve 200 within electronically controlled damper links 14L and 14R to close, open, partially close, or partially open for optimum vehicle sway bar 12 firmness settings.

In one embodiment, a vehicle steering column includes right turn and left turn limit switches such that a hard turn in either direction activates the appropriate adjustment of the remotely controllable active valve 200 within electronically controlled damper links 14L and 14R to modify the softness or firmness of electronically controlled damper links 14L and 14R (for example, a hard, right turn would cause more rigidity in electronically controlled damper links 14L and 14R thereby increasing the effectiveness of sway bar 12 and reducing vehicle body roll). Again, accelerometers in conjunction with a microprocessor and a switched power supply may perform the activation function by sensing the actual g-force associated with the turn (or braking; or acceleration, or the like) and triggering the appropriate amount of rotation of remotely controllable active valve 200 to cause electronically controlled damper links 14L and 14R to modify the softness or firmness thereof.

In one embodiment, remotely-operable electronically controlled damper links 14L and 14R are useful with an on-/off-road vehicle. These vehicles can have more than 20" of damper absorber travel to permit them to negotiate rough, uneven terrain at speed with usable damper absorbing function. In off-road applications, automated sway bar 12 firmness and even physically connectedness is necessary as the vehicle relies on the articulation of its long travel suspension when encountering often large off-road obstacles.

Operating a long travel suspension vehicle with soft setting (or a physically decoupled) sway bar 12, on a smooth road at road speeds can be problematic due to the springiness/sponginess of the suspension and corresponding vehicle handling problems associated therewith (e.g., turning roll, side pitch, yaw, steering control, and the like). A soft or disconnected sway bar 12 setting can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated electronically controlled damper links 14L and 14R, the working size of one or more flow paths of the remotely controllable valve 200 within electronically controlled damper links 14L and 14R is automatically adjusted. Correspondingly, the dampening characteristics of electronically controlled damper links 14L and 14R can be changed on the fly to adjust the sway bar firmness as part of the overall vehicle suspension.

In one embodiment, remotely controllable active valve 200 is used in a modal situation (e.g., a straight current sent to valves of electronically controlled damper links 14L and 14R), or in a semi-active situation, e.g., various sensor input that is provided to electronically controlled damper links 14L and 14R (and/or active damping control system 700) which adjust the softness or firmness of electronically controlled damper links 14L and 14R.

In one embodiment, remotely controllable valve 200 of electronically controlled damper links 14L and 14R could be solenoid controlled such as an on/off solenoid. In one embodiment, the remotely controllable valve 200 of electronically controlled damper links 14L and 14R is solenoid controlled with an infinitely adjustable range.

In one embodiment, the remotely controllable valve 200 of electronically controlled damper links 14L and 14R could be used on a vehicle such that in a turn, electronically controlled damper links 14L and 14R would be stiffened to increase the effect of sway bar 12 on the vehicle suspension and reduce body roll, or softened (or physically disconnected) to reduce or remove the effect of sway bar 12 on suspension articulation.

For example, in a high-speed turn electronically controlled damper links 14L and 14R would be stiffened to increase the effect of sway bar 12 on the vehicle suspension and reduce body roll. More specifically, in one embodiment, during a high-speed turn, the electronically controlled damper links 14L and 14R would receive no current to their remotely controllable active valve 200 maintaining compression stiffness (and therefore sway bar 12 rigidity).

In contrast, in a low-speed turn (such as while navigating an obstacle or rock crawling) electronically controlled damper links 14L and 14R would be softened (or even disconnected via electronically controlled physical disconnects 93L and 93R) to reduce the effect of sway bar 12 on the vehicle suspension and thereby increase suspension articulation. More specifically, in one embodiment, during a low-speed turn, the electronically controlled damper links 14L and 14R would receive full current to their remotely controllable active valve 200 reducing compression stiffness (and therefore reducing (or even removing) sway bar 12 rigidity from the suspension calculations).

In another example, in whoops the remotely controllable valve 200 of electronically controlled damper links 14L and 14R would be opened, closed, adjustably opened, or adjustably closed to increase the effect of sway bar 12 on the vehicle suspension and reduce body roll. Similarly, in a washboard situation, electronically controlled damper links 14L and 14R could be stiffened or softened depending upon performance requirements, user preference, etc. In a full extension scenario (e.g., jumping the vehicle) the electronically controlled damper links 14L and 14R would harden the sway bar 12 for landing.

In one embodiment, the electronic valves are in the active damping control system 700 of FIG. 4 with a controller to adjust between softer, firmer, etc., used for body roll, body motion, etc. As stated herein, remotely controllable valve 200 of electronically controlled damper links 14L and 14R can be remotely-operated and can be used in a variety of ways with many different variables. For example, a transducer, such as an accelerometer, can measure other aspects of the vehicle's suspension system, like axle force and/or moments applied to various parts, and direct change to position of remotely controllable valve 200 of electronically controlled damper links 14L and 14R (and corresponding change the working size of the opening of the orifice by causing the nipple to open, close, or partially close the orifice) in response thereto. In another example, remotely controllable valve 200 of electronically controlled damper links 14L and 14R is controlled at least in part by a suspension travel transducer measuring suspension travel and adding damping characteristics to some or all of the suspension damper(s) in conjunction with the sway bar 12 settings provided by electronically controlled damper links 14L and 14R in the event of, for example, an increased or decreased suspension travel reading that may be due to a jump, a landing, a bump, or the like.

In one embodiment of sway bar system 100 and/or sway bar system 180, the damping characteristics of electronically controlled damper link 14 are automatically adjusted by a processor such as the logic control unit (LCU) 502 and are based on one or more inputs received at LCU 502 from one or more different sensors. For example, in one embodiment, steering inputs, vehicle roll, speed, terrain, and the like are detected and/or monitored via one or more sensors on or about the vehicle to which sway bar system 100 and/or sway bar system 180 is coupled. Sensors which are utilized to monitor various parameters include, but not limited to, accelerometers, sway sensors, suspension changes, visual identification technology (e.g., single or multi spectrum cameras), driver input monitors, steering wheel turning sensors, and the like.

For example, in one embodiment LCU 502 uses an inertial measurement unit (IMU) to sense rough terrain. In one embodiment LCU 502 is coupled with an attitude and heading reference system (AHRS) that provides 3D orientation integrating data coming from inertial gyroscopes, accelerometers, magnetometers, and the like. For example, in yet another embodiment of sway bar system 100 and/or sway bar system 180, the AHRS is a GPS aided Microelectromechanical systems (MEMS) based IMU and static pressure sensor. It should be noted that in various embodiments of sway bar system 100 and/or sway bar system 180, various sensor-derived data, user input, IMU data, AHRS data, and the like, is ultimately used (e.g., by passing a corresponding signal through cable 111 of FIG. 1B to electronically controlled damper link 14) to control the damping characteristics of electronically controlled damper link 14.

As discussed herein, electronically controlled damper link 14 includes IFP 33 which, in one embodiment of sway bar system 100 and/or sway bar system 180, is placed on the rebound side to create more compression damping without causing cavitation. When a check valve opens, the damping force of electronically controlled damper link 14 will be lower thereby reducing the chances of cavitation.

In one embodiment of sway bar system 100 and/or sway bar system 180, by reducing the diameter (see e.g., reference number 19 of FIG. 2A and FIG. 2B) of shaft 24, reaction forces of shaft 24 will also be reduced. Additionally, in embodiments of sway bar system 100 and/or sway bar system 180, the diameter of damper cylinder 28 is reduced. By reducing the diameter of damper cylinder 28, the damper cylinder volume corresponding to damper cylinder 28 is also reduced. Hence, changes in the diameter of damper cylinder 28 ultimately alter the ratio between the damper cylinder volume of damper cylinder 28 and the flow area of, for example, valve 200. Reducing the damper cylinder volume with respect to the flow area of valve 200 will provide a softer initial pressure setting in gas chamber 27.

In various embodiments of sway bar system 100 and/or sway bar system 180, damping characteristics of electronically controlled damper link 14 are altered by changing a damping fluid flow path. As one example, depending upon the type of valve 200, flow path 32 can be changed. For example, the damping fluid flow path in a twin tube embodiment (see, e.g., FIG. 3A and FIG. 3B) is different from the damping fluid flow path in a non-twin tube embodiment (see, e.g., FIG. 2A and FIG. 2B).

In various embodiments of sway bar system 100 and/or sway bar system 180, damping characteristics of electronically controlled damper link 14 are altered by selectively controlling the flow of damping fluid through damping piston 25. For example, in one embodiment, electronically controlled damper link 14 includes a damping piston 25 which is a solid piston with no valving therethrough (as shown in FIG. 2A). However, in another embodiment of sway bar system 100 and/or sway bar system 180, electronically controlled damper link 14 includes a damping piston 25 which is a digressive piston (as shown in FIG. 2B). In an embodiment of sway bar system 100 and/or sway bar system 180 as depicted in FIG. 2B, by having a digressive piston on both the base valve and damping piston 25, a better high speed blow off is achieved.

Figure 5:
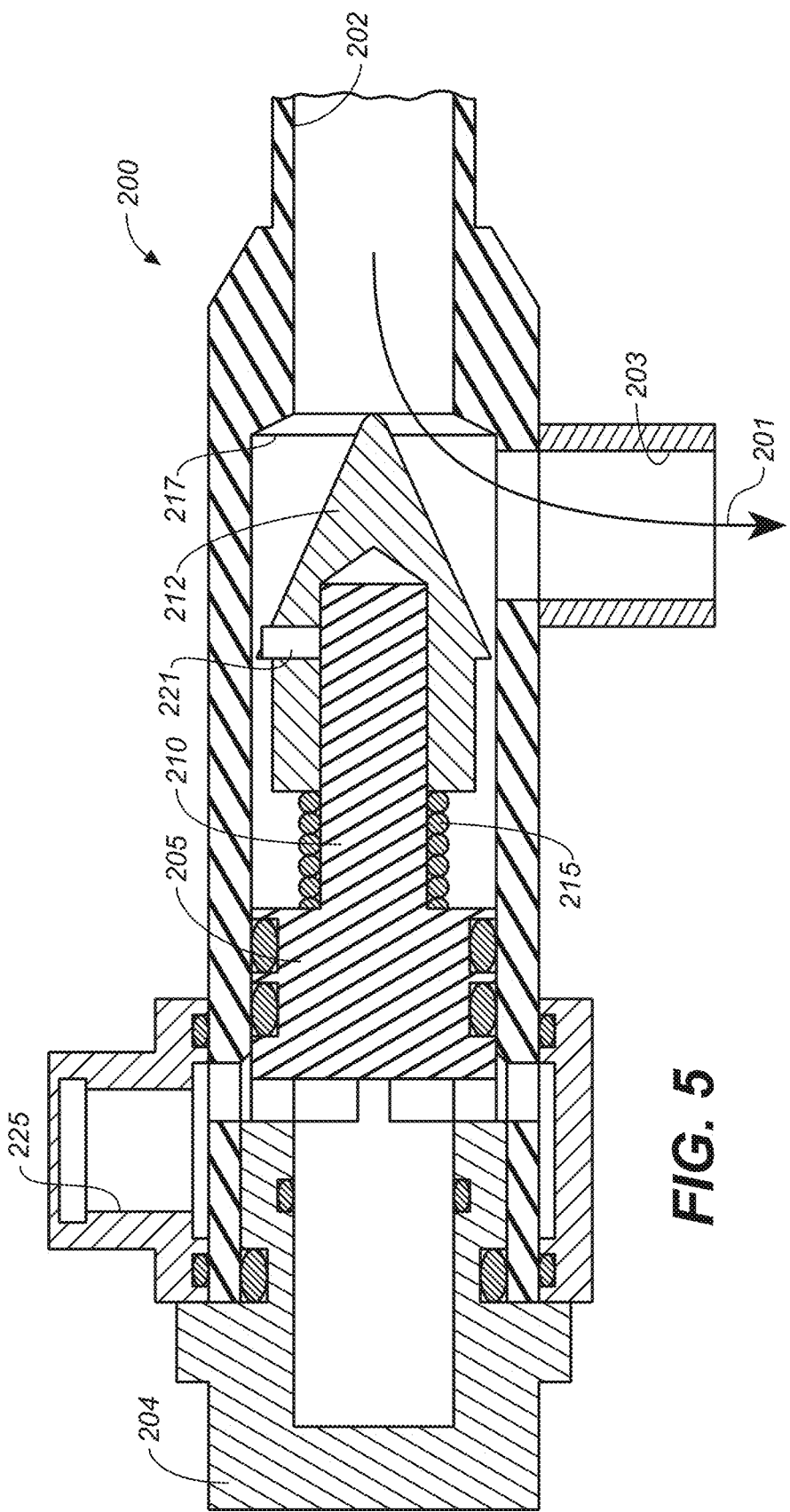
FIG. 5 is an enlarged section view showing the remotely operable valve in the open position, in accordance with an embodiment.
Figure 6:
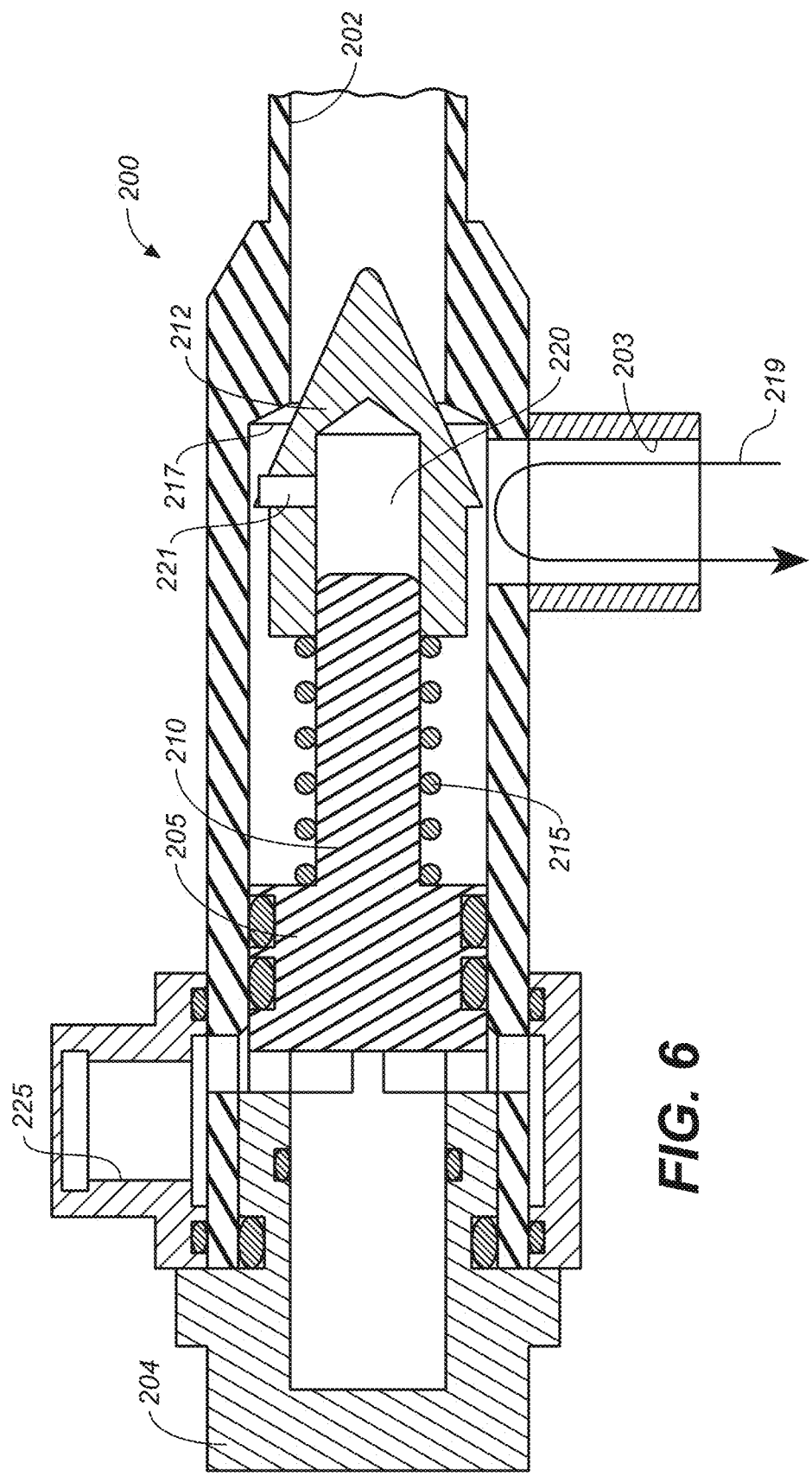
FIG. 6 is a section view showing the valve of FIG. 5 in a closed position, in accordance with an embodiment.
Figure 7:
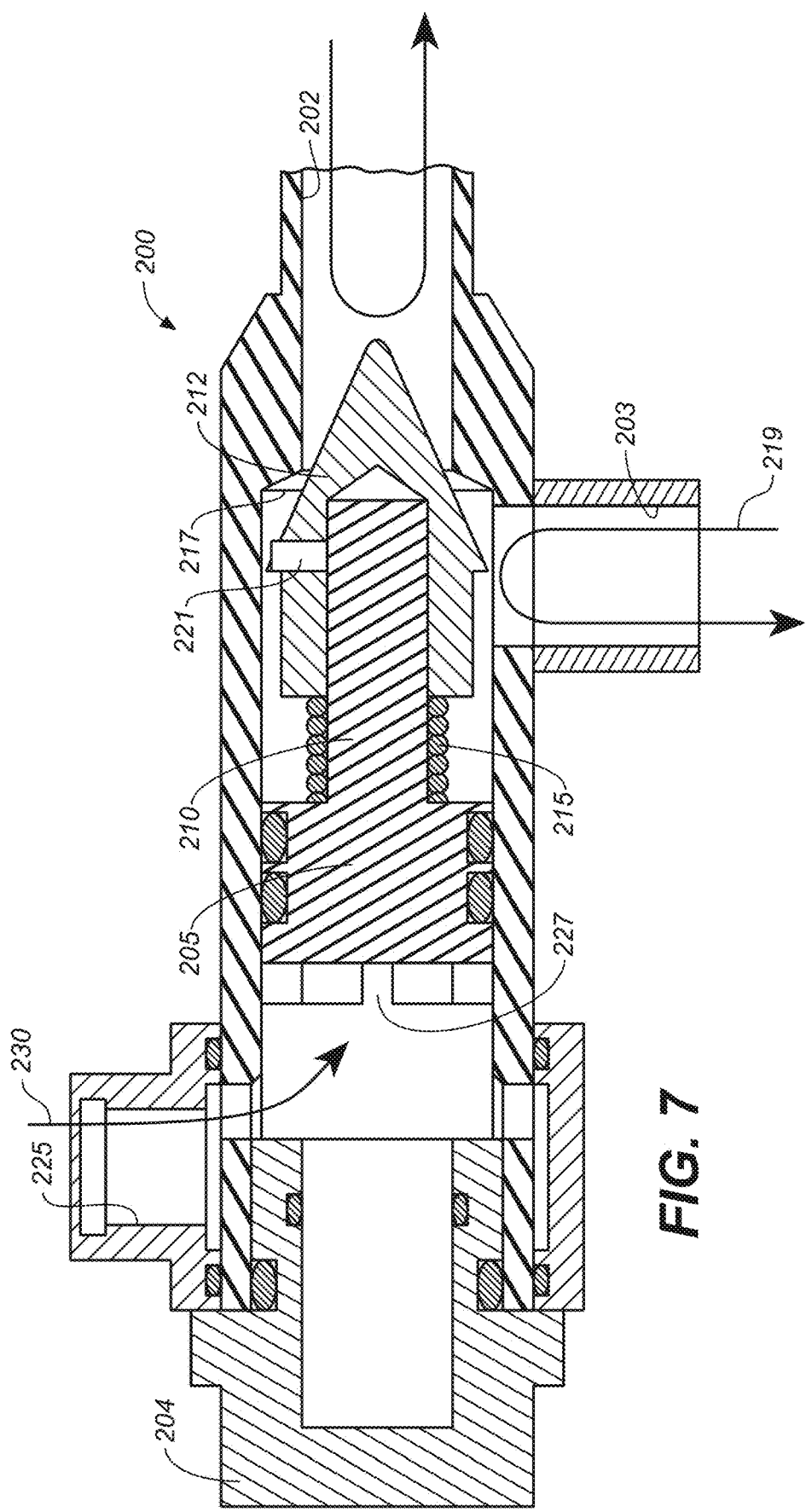
FIG. 7 is a section view showing the valve of FIG. 5 in a locked-out position, in accordance with one embodiment.

FIGS. 5, 6 and 7 are enlarged views showing the remotely controllable active valve 200 in various positions. In FIG. 5, the remotely controllable active valve 200 is in a damping-open position (and a fluid path (denoted by 201 of FIG. 5) is obtained) thereby permitting operation in a compression stroke of electronically controlled damper link 14. The remotely controllable active valve 200 includes a valve body 204 housing a movable piston 205 which is sealed within the body. Three fluid communication points are provided in the body including an inlet 202 and outlet 203 for fluid passing through the remotely controllable active valve 200 as well as an inlet 225 for control fluid as will be described herein. Extending from a first end of the piston 205 is a shaft 210 having a cone-shaped member 212 (other shapes such as spherical or flat, with corresponding seats, will also work suitably well) disposed on an end thereof. The cone-shaped member 212 is telescopically mounted relative to, and movable on, the shaft 210 and is biased in an extended position (FIG. 6) due to a spring 215 coaxially mounted on the shaft 210 between the cone-shaped member 212 and the piston 205. Due to the spring 215 biasing, the cone-shaped member 212 normally seats itself against a seat 217 formed in an interior of the valve body 204. In the damping open position shown however, fluid flow through the damper link 14 has provided adequate force on the cone-shaped member 212 to urge it backwards, at least partially loading the spring 215 and creating fluid path 201 from the damper link 14 into a rebound area of the damper cylinder 141 as shown in FIG. 2A. The characteristics of the spring 215 are typically chosen to permit the remotely controllable active valve 200 (e.g., cone-shaped member 212) to open at a predetermined bypass pressure, with a predetermined amount of control pressure applied to inlet 225, during a compression stroke of electronically controlled damper link 14. For a given spring 215, higher control pressure at inlet 225 will result in higher bypass pressure required to open the remotely controllable active valve 200 and correspondingly higher damping resistance in electronically controlled damper link 14. In one embodiment of sway bar system 100 and/or sway bar system 180, the remotely controllable active valve 200 is open in both directions when the piston 205 is "topped out" against valve body 204. In another embodiment of sway bar system 100 and/or sway bar system 180 however, when the piston 205 is abutted or "topped out" against valve body 204 the spring 215 and relative dimensions of the remotely controllable active valve 200 still allow for the cone-shaped member 212 to engage the valve seat thereby closing the remotely controllable active valve 200. In such an embodiment of sway bar system 100 and/or sway bar system 180, backflow from the rebound portion 103 of the damper cylinder 141 to the compression portion 104 is always substantially closed and cracking pressure is determined by the pre-compression in the spring 215. In such embodiment, additional fluid pressure may be added to inlet 225 through port to increase the cracking pressure and thereby increase compression damping through electronically controlled damper link 14 over that value provided by the spring compression "topped out."

FIG. 6 shows remotely controllable active valve 200 in a closed position (which it assumes during a rebound stroke of electronically controlled damper link 14). As shown, the cone-shaped member 212 is seated against seat 217 due to the force of the spring 215 and absent an opposite force from fluid entering the remotely controllable active valve 200 from electronically controlled damper link 14. As cone-shaped member 212 telescopes out, a gap 220 is formed between the end of the shaft 210 and an interior of cone-shaped member 212. A vent 221 is provided to relieve any pressure formed in the gap 220. With the fluid path 201 closed, fluid communication is substantially shut off from the rebound portion 103 of electronically controlled damper link 14 into the valve body 204 (and hence through electronically controlled damper link 14 back to the compression portion 104 is closed) and its "dead-end" path is shown by arrow 219.

Inlet 225 is formed in the valve body 204 for operation of the remotely controllable active valve 200. In one embodiment, inlet 225 may be pressurized to shift the remotely controllable active valve 200 to a third or "locked-out" position. In FIG. 7, remotely controllable active valve 200 is shown in the locked-out position, thereby preventing fluid flow through electronically controlled damper link 14 in either direction regardless of compression or rebound stroke. FIG. 10 is a graph showing some operational characteristics of the arrangement of FIG. 7, in accordance with one embodiment.

With reference again to FIG. 7, in the embodiment shown, inlet 225 provides a fluid path 230 to a piston surface 227 formed on an end of the piston 205, opposite the cone-shaped member 212. Specifically, activating pressure is introduced via inlet 225 to move the piston 205 and with it, cone-shaped member 212 toward seat 217. Sufficient activating pressure fully compresses the spring 215 (substantial stack out) and/or closes the gap 220 thereby closing the cone-shaped member 212 against the seat, sealing electronically controlled damper link 14 to both compression flow and rebound flow. In the embodiment shown, remotely controllable active valve 200 can be shifted to the third, locked-out position from either the first, open position or the second, closed position. Note that, when in the "locked out" position, remotely controllable active valve 200 as shown, will open to compression flow when the compression flow pressure acting over the surface area of the cone-shaped member 212 exceeds the inlet 225 pressure acting over the surface area of the piston 205. Such inlet 225 pressure may be selected to correspond therefore to a desired compression overpressure relief value or "blow off" value thereby allowing compression bypass under "extreme" conditions even when electronically controlled damper link 14 is "locked out".

In the embodiment illustrated, remotely controllable active valve 200 is intended to be shifted to the locked-out position with control fluid acting upon piston 205. In one embodiment, the activating pressure via inlet 225 is adjusted so that remotely controllable active valve 200 is closed to rebound fluid (with the cone-shaped member 212 in seat 217) but with the spring 215 not fully compressed or stacked out. In such a position, a high enough compression force (e.g., compression flow) will still open remotely controllable active valve 200 and allow fluid to pass through remotely controllable active valve 200 in a compression stroke. In one arrangement, the activating pressure, controlled remotely, may be adjusted between levels where the lock-out is not energized and levels where the lock-out is fully energized. The activating pressure may also be adjusted at intermediate levels to create more or less damping resistance through electronically controlled damper link 14. The activating pressure may be created by hydraulic or pneumatic input or any other suitable pressure source.

In one example of sway bar system 100 and/or sway bar system 180, remotely controllable active valve 200 is moved to a locked-out position and the electronically controlled damper link 14 is stiffened by remote control from a simple operator-actuated switch located in the passenger compartment of the vehicle. In one embodiment of sway bar system 100 and/or sway bar system 180, fluid pressure for controlling (e.g., locking-out) remotely controllable active valve 200 is provided by the vehicle's on-board source of pressurized hydraulic fluid created by, for example, the vehicle power steering system. In one embodiment, pneumatic pressure is used to control (e.g., close) remotely controllable active valve 200 where the pneumatic pressure is generated by an on-board compressor and accumulator system and conducted to remotely controllable active valve 200 via a fluid conduit. In one embodiment of sway bar system 100 and/or sway bar system 180, a linear electric motor (e.g., solenoid), or other suitable electric actuator, is used, in lieu of the aforementioned inlet 225 pressure, to move "piston 205" axially within valve body 204. A shaft of the electric actuator (not shown) may be fixed to the piston 205 such that axial movement of the shaft causes axial movement of piston 205 which in turn causes movement of cone-shaped member 212 (and compression of spring 215 as appropriate). In one embodiment, the electric actuator is configured to "push" piston 205 towards a closed position and to "pull" piston 205 away from the closed position depending on the direction of the current switched through the actuator.

As in other embodiments, remotely controllable active valve 200 may be solenoid operated or hydraulically operated or pneumatically operated or operated by any other suitable motive mechanism. Remotely controllable active valve 200 may be operated remotely by a switch 415 or potentiometer located in the cockpit of a vehicle or attached to appropriate operational parts of a vehicle for timely activation (e.g., brake pedal) or may be operated in response to input from a microprocessor (e.g., calculating desired settings based on vehicle acceleration sensor data) or any suitable combination of activation means. In a like manner, a controller for the adjustable pressure source (or for both the source and the valve) may be cockpit mounted and may be manually adjustable or microprocessor controlled or both or selectively either.

In one embodiment of sway bar system 100 and/or sway bar system 180, a pressure intensifier damper arrangement is located within the fluid path such that the solenoid-controlled valve controls flow through that auxiliary damper which is then additive with the damper mechanism of the damping piston. In one embodiment of sway bar system 100 and/or sway bar system 180, the damper mechanism of the damping piston comprises a pressure intensifier. In one embodiment one or both of the dampers comprise standard shim type dampers. In one embodiment one or both of the dampers include an adjustable needle for low-speed bleed. In one embodiment, a blow off (e.g., checking poppet type or shim) is included in one of the flow paths or in a third parallel flow path.

FIG. 8 is a schematic diagram illustrating a control arrangement 400 used to provide remote control of a remotely controllable active valve 200 using a vehicle's power steering fluid 410 (although any suitable fluid pressure source may be substituted for power steering fluid 410 as could be an electrical current source in the case of a remotely controllable active valve 200). As illustrated, a fluid pathway 405 having a switch-operated valve (and/or pressure regulator) 402 therein runs from power steering fluid 410 (or an electrical current) that is kept pressurized by, in one embodiment, a power steering pump (not shown) to a remotely controllable active valve 200 that is operable, for example, by a user selectable dash board switch 415. The switch-operated valve 402 permits fluid to travel to remotely controllable active valve 200, thereby urging it to a closed position. When switch 415 is in the "off" position, working pressure within electronically controlled damper link 14, and/or a biasing member such as a spring or annular atmospheric chamber (not shown), returns electronically controlled damper link 14 to its normally-open position (with or without residual spring compression as designed). In another embodiment, a signal line runs from switch 415 to a solenoid along an electrically conductive line. Thereafter, the solenoid converts electrical energy into mechanical movement (identified by item 405) and shifts a plunger of remotely controllable active valve 200, thereby opening or closing the valve or causing the plunger to assume some predetermined position in-between. Additional examples of hydraulically actuated valving for use with additional components are described and shown in U.S. Pat. Nos. 8,627,932; 8,857,580; 9,033,122; 9,120,362; and 9,239,090 the content of which are incorporated by reference herein, in their entirety.

While the example of FIG. 8 uses fluid power for operating remotely controllable active valve 200, a variety of means are available for remotely controlling a remotely controllable active valve 200. For instance, a source of electrical power from a 12-volt battery could be used to operate a solenoid member, thereby shifting a piston 205 in remotely controllable active valve 200 between open and closed positions. Remotely controllable active valve 200 or solenoid operating signal can be either via a physical conductor or an RF signal (or other wireless such as Bluetooth, WiFi, ANT) from a transmitter operated by the switch 415 to a receiver operable on the remotely controllable active valve 200 (which would derive power from the vehicle power system such as 12 volt). Additional information for vehicle suspension systems and their components as well as adjustment/modification/replacement aspects including manually, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Remotely controllable active valve 200 like the one described above is particularly useful with an on/off road vehicle. Operating a vehicle with very compliant, conventional sway bar on a smooth road at higher speeds can be problematic due to the springiness/sponginess of the suspension and corresponding vehicle handling problems associated with that (e.g., turning roll, braking pitch). Such compliance can cause reduced handling characteristics and even loss of control. Such control issues can be pronounced when cornering at high speed as a vehicle with a conventional compliant sway bar may tend to roll excessively. With remotely operated electronically controlled damper link 14 dampening and "lock out" described herein, dampening characteristics of electronically controlled damper link 14 can be adjusted, and as such, sway bar system 100 and/or sway bar system 180 can be completely changed from a compliantly dampened "springy" arrangement to a highly dampened and "stiffer" (or fully locked out) system ideal for higher speeds on a smooth road.

In one embodiment, where compression flow is completely blocked, closure of electronically controlled damper link 14 results in substantial "lock out" of the sway bar system 100 and/or sway bar system 180 (sway bar system 100 and/or sway bar system 180 is rendered essentially rigid except for the movement of fluid through shimmed valve). In another embodiment where some compression flow is allowed, closure of electronically controlled damper link 14 (e.g., by closure of remotely controllable active valve 200) results in a stiffer but still functional sway bar system 100 and/or sway bar system 180.

In addition to, or in lieu of, the simple, switch operated remote arrangement of FIG. 8; the remotely controllable active valve 200 can be operated automatically based upon one or more driving conditions.

FIG. 9 illustrates, for example, a system including three variables: shaft speed, shaft position and vehicle speed. Any or all of the variables shown may be considered by processor 502 in controlling the solenoid in the remotely controllable active valve 200. Any other suitable vehicle operation variable may be used in addition to or in lieu of the variables 515, 505, 510 such as for example, a vehicle mounted accelerometer (or tilt/inclinometer) data or any other suitable vehicle or component performance data. In one embodiment the position of piston 105 within damper cylinder 141 is determined using an accelerometer to sense modal resonance of damper cylinder 141. Such resonance will change depending on the position of the piston 105 and an on-board processor (computer) is calibrated to correlate resonance with axial position. In one embodiment, a suitable proximity sensor or linear coil transducer or other electro-magnetic transducer is incorporated in the damper cylinder 141 to provide a sensor to monitor the position and/or speed of the piston 105 (and suitable magnetic tag) with respect to the damper cylinder 141. In one embodiment, the magnetic transducer includes a waveguide and a magnet, such as a doughnut (toroidal) magnet that is joined to the cylinder and oriented such that the magnetic field generated by the magnet passes through shaft 24 and the waveguide. Electric pulses are applied to the waveguide from a pulse generator that provides a stream of electric pulses, each of which is also provided to a signal processing circuit for timing purposes. When the electric pulse is applied to the waveguide a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital, or analogue, proportional to the calculated distance and/or velocity. Additional examples and embodiments for transducer-operated arrangement for measuring piston rod speed and velocity are described in U.S. Pat. No. 9,623,716 the content of which is incorporated by reference herein, in its entirety.

While a transducer assembly located at electronically controlled damper link 14 measures shaft speed and location, a separate wheel speed transducer for sensing the rotational speed of a wheel about an axle includes housing fixed to the axle and containing therein, for example, two permanent magnets. In one embodiment the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Additional examples and embodiments of wheel speed transducers are described in U.S. Pat. Nos. 9,033,122; 9,452,654; 10,040,329; 10,047,817; 10,060,499 the content of which are incorporated by reference herein, in their entirety.

While the examples illustrated relate to manual operation and automated operation based upon specific parameters, remotely controllable active valve 200 or the remote operation of a pressure source can be used in a variety of ways with many different driving and road variables. In one example, remotely controllable active valve 200 is controlled based upon vehicle speed in conjunction with the angular location of the vehicle's steering wheel. In this manner, by sensing the steering wheel turn severity (angle of rotation), additional dampening can be applied to stiffen electronically controlled damper link 14 thereby stiffening sway bar system 100 and/or sway bar system 180 (suitable, for example, to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to electronically controlled damper link 14 and thus the compliance or stiffness of sway bar system 100 and/or sway bar system 180 in response thereto.

It should be noted that any of the features disclosed herein are useful alone or in any suitable combination. While the foregoing is directed to a number of described embodiments, other and further embodiments are implementable without departing from the scope of the invention and the scope thereof is determined by the Claims that follow.

What we claim is:
1. A sway bar system comprising:
a sway bar having a first end and a second end;
an electronically controlled connector to provide a remotely controllable physical connection and disconnection capability between a first location on a vehicle and said first end of said sway bar;
said second end of said sway bar coupled to a second location on said vehicle;
a graphical user interface (GUI) communicatively coupled with said vehicle;
said GUI to present configuration information about said electronically controlled connector in a user interactive format;
said GUI configured to receive a user input, said user input to change said electronically controlled connector from a present connected or disconnected configuration to the other of said connected or disconnected configuration; and a control system to receive said user input from said GUI and automatically connect or disconnect said electronically controlled connector based on said user input.

2. The sway bar system of claim 1, further comprising:
a second electronically controlled connector, said second electronically controlled connector to provide a remotely controllable physical connection and disconnection capability between said second end of said sway bar and said second location on said vehicle.

3. The sway bar system of claim 1, further comprising:
said first location on said vehicle is a control arm on a first side of said vehicle; and
said second location on said vehicle is another control arm on a second side of said vehicle.

4. The sway bar system of claim 1, further comprising:
said first location on said vehicle is a suspension component on a first side of said vehicle; and
said second location on said vehicle is another suspension component on a second side of said vehicle.

5. The sway bar system of claim 1, further comprising:
an electronically controlled damper link, said electronically controlled damper link coupled between said first location on said vehicle and said electronically controlled connector.

6. The sway bar system of claim 1, further comprising:
an electronically controlled damper link, said electronically controlled damper link coupled between said second end of said sway bar and said second location on said vehicle.

7. The sway bar system of claim 6, wherein said electronically controlled damper link comprises:
a damper cylinder, said damper cylinder having a damper cylinder volume;
a damping piston axially moveable within said damper cylinder;
a shaft fixedly coupled to said damping piston;
a fluid reserve cylinder, said fluid reserve cylinder comprising:
a fluid reservoir chamber;
a gas chamber; and
an internal floating piston fluidly separating said fluid reservoir chamber and said gas chamber; and
a valve fluidly coupled to said damper cylinder and said fluid reserve cylinder, said valve having a flow area wherein a ratio of said damper cylinder volume to said flow area of said valve is adjustable.

8. The sway bar system of claim 1, wherein said electronically controlled connector comprises:
a linear actuator to provide said remotely controllable physical connection and disconnection capability.

9. The sway bar system of claim 1, wherein said electronically controlled connector comprises:
a rotary actuator to provide said remotely controllable physical connection and disconnection capability.

10. The sway bar system of claim 1, further comprising:
the control system to automatically connect or disconnect said electronically controlled connector based on external conditions.

11. The sway bar system of claim 1, further comprising:
the control system to automatically connect or disconnect said electronically controlled connector based on one or more sensor inputs received from one or more sensors selected from a group consisting of: an inertial gyroscope, an accelerometer, a magnetometer, a steering wheel turning sensor, a single spectrum camera, and a multi spectrum camera.

12. The sway bar system of claim 1, further comprising:
the control system to automatically connect or disconnect said electronically controlled connector based on one or more characteristics selected from a group consisting of: a user preference, a vehicle speed, a maneuver, and a ride type.

13. A vehicle sway bar system comprising:
a sway bar having a first end and a second end;
a first electronically controlled connector to provide a remotely controllable physical connection and disconnection capability between a first location on a vehicle and said first end of said sway bar;
a second electronically controlled connector, said second electronically controlled connector to provide a remotely controllable physical connection and disconnection capability between said second end of said sway bar and a second location on said vehicle;
a graphical user interface (GUI) communicatively coupled with said vehicle;
said GUI to present configuration information about one or both of said first electronically controlled connector and said second electronically controlled connector in a user interactive format;
said GUI configured to receive a user input, said user input to change one or both of said first electronically controlled connector and said second electronically controlled connector from a present connected or disconnected configuration to the other of said connected or disconnected configuration; and
a control system to receive said user input from said GUI and automatically connect or disconnect one or both of said first electronically controlled connector and said second electronically controlled connector based on said user input.

14. The vehicle sway bar system of claim 13, further comprising:
the control system to automatically connect or disconnect one or both of said first electronically controlled connector and said second electronically controlled connector based on external conditions.

15. The vehicle sway bar system of claim 13, further comprising:
the control system to automatically connect or disconnect one or both of said first electronically controlled connector and said second electronically controlled connector based on one or more sensor inputs received from one or more sensors selected from a group consisting of: an inertial gyroscope, an accelerometer, a magnetometer, a steering wheel turning sensor, a single spectrum camera, and a multi spectrum camera.

16. The vehicle sway bar system of claim 13, further comprising:
the control system to automatically connect or disconnect one or both of said first electronically controlled connector and said second electronically controlled connector based on one or more characteristics selected from a group consisting of: a user preference, a vehicle speed, a maneuver, and a ride type.

* * * * *